United States Patent
Kanna et al.

(10) Patent No.: US 10,471,689 B2
(45) Date of Patent: Nov. 12, 2019

(54) TRANSFER FILM, TRANSPARENT LAMINATE, METHOD FOR PRODUCING TRANSFER FILM, METHOD FOR PRODUCING TRANSPARENT LAMINATE, CAPACITIVE INPUT DEVICE, AND IMAGE DISPLAY DEVICE

(71) Applicant: FUJIFILM Corporation, Minato-ku, Tokyo (JP)

(72) Inventors: Shinichi Kanna, Fujinomiya (JP); Hideaki Ito, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 38 days.

(21) Appl. No.: 14/721,126

(22) Filed: May 26, 2015

(65) Prior Publication Data
US 2015/0251393 A1 Sep. 10, 2015

Related U.S. Application Data

(63) Continuation of application No. PCT/JP2013/081362, filed on Nov. 21, 2013.

(30) Foreign Application Priority Data

Nov. 30, 2012 (JP) .................................. 2012-262982

(51) Int. Cl.
*B32B 27/08* (2006.01)
*B32B 27/00* (2006.01)
(Continued)

(52) U.S. Cl.
CPC ............... *B32B 27/08* (2013.01); *B32B 3/10* (2013.01); *B32B 27/20* (2013.01); *B32B 37/14* (2013.01);
(Continued)

(58) Field of Classification Search
CPC .............. B32B 37/14; B32B 2307/412; B32B 2307/418; B32B 2309/105;
(Continued)

(56) References Cited

U.S. PATENT DOCUMENTS

2008/0055521 A1  3/2008  Mizutani et al.
2009/0259203 A1  10/2009  Hu et al.
(Continued)

FOREIGN PATENT DOCUMENTS

CN  101441282 A  5/2009
CN  102034565 A  4/2011
(Continued)

OTHER PUBLICATIONS

Machine translation of JP 2011-098563 A.*
(Continued)

*Primary Examiner* — Kregg T Brooks
(74) *Attorney, Agent, or Firm* — Sughrue Mion, PLLC

(57) ABSTRACT

A transfer film has a temporary support, a first curable transparent resin layer, a second curable transparent resin layer which is disposed adjacent to the first curable transparent resin layer in this order. The refractive index of the second curable transparent resin layer is higher than the refractive index of the first curable transparent resin layer and equal to or greater than 1.6.

12 Claims, 12 Drawing Sheets

(51) Int. Cl.
  B32B 27/20    (2006.01)
  B32B 27/30    (2006.01)
  B32B 37/14    (2006.01)
  B32B 37/24    (2006.01)
  B32B 37/26    (2006.01)
  B32B 38/10    (2006.01)
  B32B 7/02     (2019.01)
  B32B 37/00    (2006.01)
  B32B 37/02    (2006.01)
  B32B 38/00    (2006.01)
  G06F 3/044    (2006.01)
  G06F 3/041    (2006.01)
  B32B 3/10     (2006.01)

(52) U.S. Cl.
  CPC .............. *B32B 37/26* (2013.01); *B32B 38/10* (2013.01); *G06F 3/044* (2013.01); *B32B 2037/243* (2013.01); *B32B 2037/268* (2013.01); *B32B 2255/26* (2013.01); *B32B 2305/72* (2013.01); *B32B 2307/412* (2013.01); *B32B 2307/418* (2013.01); *B32B 2309/105* (2013.01); *B32B 2310/0831* (2013.01); *B32B 2457/20* (2013.01); *G06F 2203/04103* (2013.01); *G06F 2203/04111* (2013.01); *Y10T 156/10* (2015.01); *Y10T 428/24802* (2015.01); *Y10T 428/263* (2015.01); *Y10T 428/31544* (2015.04)

(58) Field of Classification Search
  CPC . B32B 2310/0831; B32B 27/08; B32B 27/20; G06F 3/044
  See application file for complete search history.

(56) References Cited

U.S. PATENT DOCUMENTS

| | | | |
|---|---|---|---|
| 2010/0024954 A1 | 2/2010 | Ito et al. | |
| 2011/0230584 A1 | 9/2011 | Araki et al. | |
| 2013/0044074 A1* | 2/2013 | Park | G02F 1/13338 345/174 |
| 2013/0258479 A1* | 10/2013 | Okafuji | C08F 290/06 359/586 |
| 2013/0258570 A1 | 10/2013 | Nashiki et al. | |
| 2015/0109252 A1 | 4/2015 | Kanna et al. | |
| 2015/0125680 A1* | 5/2015 | Araki | G03F 7/30 428/216 |
| 2015/0251393 A1 | 9/2015 | Kanna et al. | |

FOREIGN PATENT DOCUMENTS

| | | |
|---|---|---|
| CN | 103302913 A | 9/2013 |
| CN | 104395867 A | 3/2015 |
| JP | 2003-215308 A | 7/2003 |
| JP | 2003-245978 A | 9/2003 |
| JP | 2006-276317 A | 10/2006 |
| JP | 2007-334045 A | 12/2007 |
| JP | 2008-107779 A | 5/2008 |
| JP | 2010-061425 A | 3/2010 |
| JP | 2010-086684 A | 4/2010 |
| JP | 2010-152809 A | 7/2010 |
| JP | 2010-257492 A | 11/2010 |
| JP | 2011095716 A | 5/2011 |
| JP | 2011098563 A * | 5/2011 |
| JP | 2012022460 A | 2/2012 |
| JP | 2013-180551 A | 9/2013 |
| JP | 2014010814 A | 1/2014 |
| JP | 2014108541 A | 6/2014 |
| KR | 1020080018853 A | 2/2008 |
| KR | 20110104664 A * | 9/2011 |
| KR | 1020110114506 A | 10/2011 |
| WO | 2010/061744 A1 | 6/2010 |
| WO | 2012/073990 A1 | 6/2012 |
| WO | 2012/086749 A1 | 6/2012 |
| WO | 2014/007050 A1 | 1/2014 |

OTHER PUBLICATIONS

Partial machine translation of KR-20110104664-A (2017).*
Fluorinated Coatings and Finishes Handbook—The Definitive User's Guide (2nd Edition) (2016).*
Communication dated Jan. 20, 2017, issued by the Korean Intellectual Property Office in corresponding Korean Application No. 10-2016-7030109.
Communication dated Aug. 29, 2016, issued by the Korean Intellectual Property Office in corresponding Korean Application No. 10-2015-7013561.
Communication dated Nov. 27, 2015, from the Japanese Patent Office in counterpart application No. 2012-262982, 23 pages in Japanese and English.
Communication dated Jul. 19, 2016 from the State Intellectual Property Office of the P.R.C. in counterpart Application No. 201380061129.7.
Communication dated Dec. 30, 2015, from the State Intellectual Property Office of the People's Republic of China in counterpart application No. 201380061129.7, 25 pages in Chinese and English.
Communication dated Feb. 14, 2017 from the Korean Intellectual Property Office in counterpart Application No. 10-2015-7013561.
Communication dated Jan. 25, 2017 from the State Intellectual Property Office of the P.R.C. in counterpart Application No. 201380061129.7.
International Preliminary Report on Patentability and Written Opinion, dated Jun. 2, 2015, in corresponding International Application No. PCT/JP2013/081362, 21 pages in English and Japanese.
International Search Report for PCT/JP2013/081362 dated Feb. 25, 2014 [PCT/ISA/210], 2 pages.
Written Opinion for PCT/JP2013/081362 dated Feb. 25, 2014 [PCT/ISA/237] . 6 pages.
Satoh et al., "Anti-Reflective Coating Agent," Daikin Industries, Inc., The Chemical Times, Oct. 1, 2003, No. 4, 9 pages in English and Japanese.
Kimura, "Performance Enhancement of Anti-Reflection Film and New Function thereof," NOF Corporation, downloaded from http://kinoufilm.nof.co.jp/articles/article3-2.html on Jan. 26, 2016, copyrighted 2000-2011 NOF Corporation, 7 pages in English and Japanese.
Communication dated Jun. 6, 2017, from the Japanese Patent Office in counterpart application No. 2016-080037.
Communication dated Mar. 27, 2018, from Japanese Patent Office in counterpart application No. 2016-080037.
Communication dated Jun. 6, 2018, issued from the State Intellectual Property Office of the P.R.C. in corresponding Chinese application No. 201610885219.3.
Office Action dated Mar. 1, 2019 from the State Intellectual Property Office of the P.R.C. in Chinese Application No. 201610885219.3.

* cited by examiner

TRANSFER FILM, TRANSPARENT LAMINATE, METHOD FOR PRODUCING TRANSFER FILM, METHOD FOR PRODUCING TRANSPARENT LAMINATE, CAPACITIVE INPUT DEVICE, AND IMAGE DISPLAY DEVICE

CROSS-REFERENCE TO RELATED APPLICATIONS

This application is a Continuation of PCT International Application No. PCT/JP2013/081362 filed on Nov. 21, 2013, which claims priority under 35 U.S.C § 119(a) to Japanese Patent Application No. 2012-262982 filed on Nov. 30, 2012. Each of the above applications is hereby expressly incorporated by reference, in its entirety, into the present application.

BACKGROUND OF THE INVENTION

1. Field of the Invention

The present invention relates to a transfer film, a transparent laminate, a method for producing the transfer film, a method for producing the transparent laminate, a capacitive input device, and an image display device. Specifically, the present invention relates to a capacitive input device which can detect a contact position of a finger by detecting a change in capacitance, a transparent laminate usable in the capacitive input device, a transfer film used for producing the transparent laminate, a method for producing a transfer film, a method for producing a transparent laminate using the transfer film, and an image display apparatus including the capacitance input device as a constituent.

2. Description of the Related Art

In recent years, in electronic instruments such as cellular phones, car navigations, personal computers, ticket vending machines, and banking terminals, a tablet-type input device has been mounted on the surface of a liquid crystal device or the like. When an instruction image is displayed on an image display area of the liquid crystal device, a user touches the site displaying the instruction image with a finger, a stylus, or the like with reference to the instruction image, and in this manner, information corresponding to the instruction image can be input.

Such an input device (touch panel) includes a resistive film-type input device, a capacitive input device, and the like. However, having a double-sheet structure consisting of a film and glass in which a short circuit is caused by pushing down the film, the resistive film-type input device has defects such as a narrow range of operation temperature and vulnerability to temporal change.

In contrast, the capacitive input device has an advantage that it can be prepared simply by forming a light-transmitting conductive film on a sheet of substrate. Such a capacitive input device includes, for example, a type of input device which has electrode patterns extending in directions crossing each other, and detects an input position by detecting the change in capacitance between the electrodes when a finger or the like comes into contact with the device (for examples, see JP2010-86684A, JP2010-152809A, and JP2010-257492A).

At the time of using the aforementioned capacitive input device, for example, when a light source is projected on the device and thus regular reflection occurs, a transparent electrode pattern becomes noticeable in a position slightly distant from the vicinity of the position where the regular reflection occurs, and it makes the device unattractive. That is, the capacitive input device has a problem of visibility. In contrast, in JP2010-86684A, an ITO pattern is formed on a substrate, and only on the upper side of the ITO pattern, a layer formed of a dielectric material with a low refractive index such as $SiO_2$ and a layer formed of a dielectric material with a high refractive index such as $Nb_2O_5$ are alternately laminated. JP2010-86684A describes that by an optical interference effect resulting from the respective layers, the transparent electrode pattern becomes a stealth pattern, and the color tone thereof becomes neutral.

In JP2010-152809A, before an ITO pattern is formed on a substrate, only on the lower side of the ITO pattern, a low-refractive index layer such as $SiO_2$ and a high-refractive index layer such as $Nb_2O_5$ are laminated, and then the ITO pattern is formed. JP2010-152809A describes that in this way, it is possible to prevent the emergence of the shape of a transparent electrode pattern.

In JP2010-257492A, before an ITO pattern is formed on a substrate, only on the lower side of the ITO pattern, a low-refractive index layer such as $SiO_2$ and a high-refractive index layer such as $Nb_2O_5$ are laminated. JP2010-257492A describes that in this way, it is possible to prevent a transparent electrode pattern or a crossing portion of patterns from becoming noticeable.

Various methods are known as methods for forming a transparent film such as a transparent insulating layer or a transparent protective film described in the aforementioned documents. Currently, as the smart phones or tablet PCs including a capacitive touch panel on a liquid crystal display or on an organic EL display, those using reinforced glass, which is represented by Gorilla Glass from Corning Inc., for a front panel (a surface that comes into direct contact with a finger) are being developed and presented. Furthermore, the smart phones or tablet PCs, in which an opening portion for installing a pressure-sensitive switch (a pressing-type mechanical mechanism that does not sense a change in capacitance) is formed in a portion of the front panel, are on the market. The reinforced glass has high strength and is not easily processed. Therefore, generally, in order to form the opening portion, the opening portion is formed prior to reinforcement processing, and then the reinforcement processing is performed.

As a method for forming a transparent insulating layer or a transparent protective film, WO2010/061744A or JP2010-061425A describes only a method of performing coating in a case of using an organic material. However, if a transparent insulating layer or a transparent protective film is formed on the aforementioned substrate, which has the opening portion and has undergone the reinforcement processing, by means of the coating method described in WO2010/061744A or JP2010-061425A by using the material described in the JP2010-257492A and WO2010/061744A, a resist component leaks or sticks out of the opening portion. Consequentially, a step of removing the sticking portion is necessary, and this leads to a problem of great reduction in production efficiency.

Meanwhile, JP2007-334045A and JP2008-107779A describe a transfer material for a color filter and suggest lamination of the transfer material on a substrate. However, although these documents made a mention of the use of the material in a liquid crystal display device, a method for improving the visibility of an ITO pattern was not examined in the documents. Moreover, the documents did not describe the application of the transfer material to a capacitive input device.

SUMMARY OF THE INVENTION

In contrast, the present inventors examined the layer constitution described in JP2010-86684A, JP2010-

152809A, and JP2010-257492A. As a result, they found that the transparent electrode pattern is visually recognized, and the problem in that the transparent electrode pattern is visually recognized cannot be completely resolved.

An object of the present invention is to provide a transfer film which makes it possible to form a transparent laminate without causing a problem in that the transparent electrode pattern is visually recognized.

The present inventors found that if a transfer film is used which has a temporary support, a first curable transparent resin layer with a low refractive index having been adjusted to fall into a specific range of a refractive index, and a second curable transparent resin layer of high refractive that are adjacent to each other, it is possible to solve the problem in that a transparent electrode pattern in a transparent laminate, which is formed by transferring the second curable transparent resin layer with a high refractive index having been adjusted within a specific range of a refractive index and the first curable transparent resin layer with a low refractive index onto the transparent electrode pattern, is visually recognized.

The present invention as specific means for achieving the aforementioned object is as follows.

[1] A transfer film including a temporary support, a first curable transparent resin layer, and a second curable transparent resin layer disposed adjacent to the first curable transparent resin layer in this order, in which the refractive index of the second curable transparent resin layer is greater than the refractive index of the first curable transparent resin layer and equal to or greater than 1.6, the first curable transparent resin layer and the second curable transparent resin layer are transferred on a transparent electrode pattern.

[2] The transfer film described in [1], in which the refractive index of the first curable transparent resin layer is preferably 1.5 to 1.53.

[3] The transfer film described in [1] or [2], in which the refractive index of the second curable transparent resin layer is preferably equal to or greater than 1.65.

[4] The transfer film described in any one of [1] to [3], in which the thickness of the second curable transparent resin layer is preferably equal to or less than 500 nm.

[5] The transfer film described in any one of [1] to [4], in which the thickness of the second curable transparent resin layer is preferably equal to or less than 100 nm.

[6] The transfer film described in any one of [1] to [5], in which the thickness of the first curable transparent resin layer is preferably equal to or greater than 1 µm.

[7] The transfer film described in any one of [1] to [6], in which the first curable transparent resin layer preferably contains a polymerizable compound and a photopolymerization initiator.

[8] The transfer film described in any one of [1] to [7], in which a double bond consumption rate of the first curable transparent resin layer is preferably equal to or higher than 10%.

[9] The transfer film described in any one of [1] to [8], in which the second curable transparent resin layer preferably contains particles having a refractive index of equal to or greater than 1.55.

[10] The transfer film described in any one of [1] to [9], in which the second curable transparent resin layer preferably contains a polymerizable compound.

[11] The transfer film described in any one of [1] to [10], in which both the first curable transparent resin layer and the second curable transparent resin layer are preferably thermosetting resin layers.

[12] The transfer film described in any one of [1] to [11], preferably further including a thermoplastic resin layer between the temporary support and the first curable transparent resin layer.

[13] The transfer film described in [12], preferably further including an intermediate layer between the first curable transparent resin layer and the thermoplastic resin layer.

[14] A method for producing a transfer film, including (b) forming a first curable transparent resin layer containing a polymerizable compound and a photopolymerization initiator on a temporary support, (c) curing the first curable transparent resin layer by exposure, and (d) forming a second curable transparent resin layer directly on the cured first curable transparent resin layer, in which the refractive index of the second curable transparent resin layer is greater than the refractive index of the first curable transparent resin layer and equal to or greater than 1.6.

[15] The method for producing a transfer film described in [14], preferably further including (a) forming a thermoplastic resin layer before forming the first curable transparent resin layer on the temporary support.

[16] A method for producing a transparent laminate, including laminating the second curable transparent resin layer and the first curable transparent resin layer of the transfer film described in any one of [1] to [13] in this order on a transparent electrode pattern.

[17] The method for producing a transparent laminate described in [16], preferably further including removing the temporary support.

[18] A transparent laminate produced by the method for producing a transparent laminate described in [16] or [17].

[19] A transparent laminate including a transparent electrode pattern, a second curable transparent resin layer disposed adjacent to the transparent electrode pattern, and a first curable transparent resin layer disposed adjacent to the second curable transparent resin layer, in which the refractive index of the second curable transparent resin layer is greater than the refractive index of the first curable transparent resin layer and equal to or greater than 1.6.

[20] The transparent laminate described in [19], preferably further including a transparent film having the refractive index of 1.6 to 1.78 and the thickness of 55 nm to 110 nm on a side of the transparent electrode pattern that is opposite to a side where the second curable transparent resin layer has been formed.

[21] The transparent laminate described in [19] or [20], in which a double bond consumption rate of the first curable transparent resin layer is preferably equal to or higher than 10%.

[22] A capacitive input device prepared by using the transfer film described in any one of [1] to [13].

[23] A capacitive input device including the transparent laminate described in any one of [18] to [21]

[24] An image display device including the capacitive input device described in [22] or [23] as a constituent.

[25] The transfer film described in any one of [1] to [13], comprises a protective film on the surface of the second curable transparent resin layer.

According to the present invention, it is possible to provide a transfer film which makes it possible to form a transparent laminate that does not cause a problem in that a transparent electrode pattern is visually recognized.

DESCRIPTION OF THE PREFERRED EMBODIMENTS

Figure 1A:
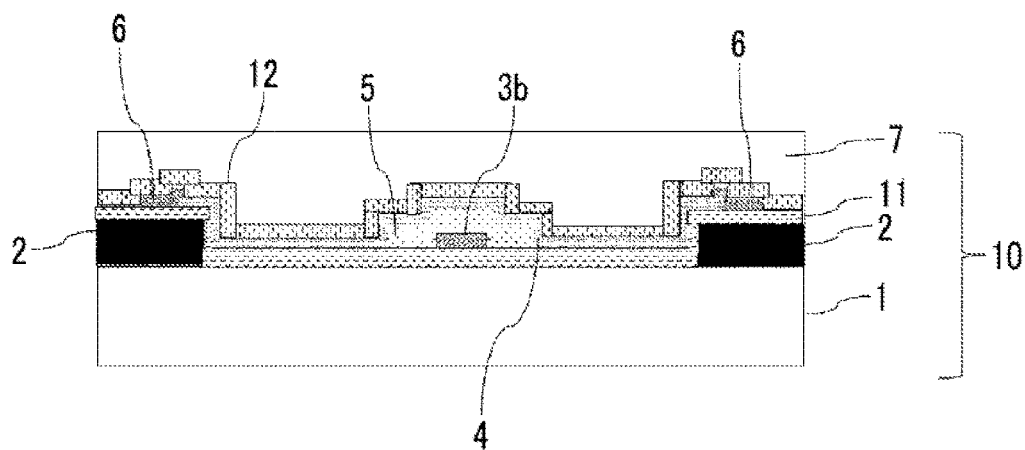
FIG. 1A is a schematic cross-sectional view showing an example of a constitution of a capacitive input device of the present invention.

Hereinafter, a transparent laminate, a capacitive input device, and an image display device of the present invention will be described. The following constituent will be described based on typical embodiments or specific examples of the present invention in some cases, but the present invention is not limited to the embodiments and specific examples. Furthermore, in the present specification, a range of numerical values represented by using "to" means a range which includes numerical values listed before and after "to" as the lower limit and upper limit respectively.

In the present specification, unless otherwise specified, the refractive index of each layer means the refractive index at a wavelength of 550 nm.

[Transfer Film]

The transfer film of the present invention has a temporary support, a first curable transparent resin layer, and a second curable transparent resin layer disposed adjacent to the first curable transparent resin layer in this order. The refractive index of the second curable transparent resin layer is greater than the refractive index of the first curable transparent resin layer and equal to or greater than 1.6.

According to the above constitution, it is possible to form a transparent laminate that does not cause a problem in that the transparent electrode pattern is visually recognized. If a difference in a refractive index between the transparent electrode pattern (preferably ITO) and the second curable transparent resin layer and a difference in a refractive index between the second curable transparent resin layer and the first curable transparent resin layer are reduced, reflection of light is reduced. As a result, the transparent electrode pattern is not easily become noticeable, and the visibility can be improved.

Hereinafter, preferable embodiments of the transfer film of the present invention will be described. The transfer film of the present invention is preferably used for a transparent insulating layer or a transparent protective film of a capacitive input device.

<Temporary Support>

The transfer film of the present invention has a temporary support.

As the temporary support, it is possible to use materials that have flexibility and do not undergo serious deformation, shrinkage, and stretching even when under pressure or when heated under pressure. Examples of such a temporary support include a polyethylene terephthalate film, a cellulose triacetate film, a polystyrene film, a polycarbonate film, and the like. Among these, a biaxially oriented polyethylene terephthalate film is particularly preferable.

The thickness of the temporary support is not particularly limited and is generally within a range of 5 μm to 200 μm. In view of ease of handleability, versatility, and the like, the thickness is particularly preferably within a range of 10 μm to 150 μm.

Furthermore, the temporary support may be transparent or may contain silicon in the dye form, an alumina sol, a chrome salt, a zirconium salt, and the like.

In addition, conductivity can be given to the temporary support by the method described in JP2005-221726A and the like.

<First Curable Transparent Resin Layer and Second Curable Transparent Resin Layer>

The transfer film of the present invention has a first curable transparent resin layer and a second curable transparent resin layer which is disposed adjacent to the first curable transparent resin layer. The refractive index of the second curable transparent resin layer is greater than the refractive index of the first curable transparent resin layer and equal to or greater than 1.6.

Each of the first curable transparent resin layer and the second curable transparent resin layer may be thermosetting, photocurable, or thermosetting and photocurable. Particularly, from the viewpoint of being able to give reliability to the film by performing thermal curing after transfer, each of the first curable transparent resin layer and the second curable transparent resin layer is preferably at least a thermosetting transparent resin layer. From the viewpoint of making it easy to forming a film by performing photocuring after transfer and from the viewpoint of being able to give reliability to the film by performing thermal curing after forming the film, each of the first curable transparent resin layer and the second curable transparent resin layer is more preferably a thermosetting and photocurable transparent resin layer.

In the present specification, for the convenience of description, when the first curable transparent resin layer and the second curable transparent resin layer of the transfer film of the present invention are transferred onto a transparent electrode pattern and photocured, and then these layers lose photocurable properties afterward, they are still referred to as the first curable transparent resin layer and the second curable transparent resin layer respectively regardless of whether or not the layers have thermosetting properties. Moreover, there is a case in which the layers are photocured and then thermally cured, and even in this case, they are still referred to as the first curable transparent resin layer and the second curable transparent resin layer respectively regardless of whether or not the layers have curability.

(Material of First Curable Transparent Resin Layer and Second Curable Transparent Resin Layer)

The materials of the first curable transparent resin layer and the second curable transparent resin layer are not particularly limited, as long as the refractive index thereof satisfies the aforementioned range of a refractive index.

The transfer film of the present invention may be a negative material or a positive material.

When the transfer film of the present invention is a negative material, the first curable transparent resin layer and the second curable transparent resin layer preferably contain metal oxide particles, resin (preferably alkali-soluble resin), a polymerizable compound, a polymerization initiator, or a polymerization initiating system. Furthermore, additives and the like can be used, but the present invention is not limited thereto.

In the transfer film of the present invention, each of the first curable transparent resin layer and the second curable transparent resin layer may be a transparent resin film or an inorganic film.

As the inorganic film, it is possible to use the inorganic films described in JP2010-86684A, JP2010-152809A, JP2010-257492A, and the like. From the viewpoint of controlling a refractive index, it is preferable to use the inorganic film, which has a structure of a laminate of a low-refractive index material and a high-refractive index material, and the inorganic film, which is a film of a mixture of a low-refractive index material and a high-refractive index material, described in the above documents. As the low-refractive index material and the high-refractive index material, it is possible to preferably use the materials used in JP2010-86684A, JP2010-152809A, JP2010-257492A, and the like.

The inorganic film may be a film of a mixture of $SiO_2$ and $Nb_2O_5$. In this case, the inorganic film is more preferably a film of a mixture of $SiO_2$ and $Nb_2O_5$ that has been formed by sputtering.

In the present invention, each of the first curable transparent resin layer and the second curable transparent resin layer is preferably a transparent resin film.

The method for controlling the refractive index of the transparent resin film is not particularly limited. However, it is possible to use only a transparent resin film having an intended refractive index or to use a transparent resin film to which particles such as metal particles or metal oxide particles have been added.

In order to regulate a refractive index or light transmitting properties, a resin composition used for the transparent resin film preferably contains metal oxide particles. Because the metal oxide particles have a high degree of transparency and light transmitting properties, a positive photosensitive resin composition having a high refractive index and excellent transparency can be obtained.

It is preferable that the refractive index of the metal oxide particles is greater than the refractive index of the resin composition formed of materials excluding the particles. Specifically, the refractive index of the metal oxide particles is preferably equal to or greater than 1.50, more preferably equal to or greater than 1.55, particularly preferably equal to or greater than 1.70, and most preferably equal to or greater than 1.90, with respect to light having a wavelength of 400 nm to 750 nm.

Herein, when the refractive index is equal to or greater than 1.50 with respect to light having a wavelength of 400 nm to 750 nm, it means that the average refractive index is equal to or greater than 1.50 with respect to light having a wavelength within the above range, and the refractive index does not need to be equal to or greater than 1.50 with respect to all of the light having the wavelength within the above range. Furthermore, the average refractive index is a value obtained by dividing the sum of measured values of the refractive index with respect to each light having a wavelength within the above range by the number of measurement points.

The metal of the metal oxide particles also includes semimetals such as B, Si, Ge, As, Sb, and Te.

As the metal oxide particles that transmit light and has a high refractive index, oxide particles containing an atom of Be, Mg, Ca, Sr, Ba, Sc, Y, La, Ce, Gd, Tb, Dy, Yb, Lu, Ti, Zr, Hf, Nb, Mo, W, Zn, B, Al, Si, Ge, Sn, Pb, Sb, Bi, Te, or the like are preferable; titanium oxide, titanium composite oxide, zinc oxide, zirconium oxide, indium/tin oxide, and antimony/tin oxide are more preferable; titanium oxide, titanium composite oxide, and zirconium oxide are even more preferable; titanium oxide and zirconium oxide are particularly preferable; and titanium dioxide is most preferable. As the titanium dioxide, rutile-type titanium dioxide having a high refractive index is particularly preferable. In order to give dispersion stability to the metal oxide particles, the surface of the particles can also be treated with an organic material.

From the viewpoint of transparency of the resin composition, the average primary particle size of the metal oxide particles is preferably 1 nm to 200 nm, and particularly preferably 3 nm to 80 nm. The average primary particle size of the particles is obtained by measuring the particle sizes of 200 random particles by using an electron microscope and calculating the arithmetic mean thereof. When the particle shape is not spherical, the longest side is taken as the diameter.

One kind of the metal oxide particles may be used singly, or two or more kinds thereof can be used concurrently.

The content of the metal oxide particles in the resin composition may be appropriately determined in consideration of the refractive index or light transmitting properties required for an optical member obtained from the resin composition. However, the content of the metal oxide particles is preferably 5% by mass to 80% by mass and more preferably 10% by mass to 70% by mass, with respect to the total solid content of the resin composition.

In the transfer film of the present invention, from the viewpoint of controlling the refractive index within the range of the refractive index of the first curable transparent resin layer and the second curable transparent resin layer, the transparent resin film preferably contains at least either $ZrO_2$ particles or $TiO_2$ particles, and more preferably contains $ZrO_2$ particles.

The resin (referred to as a binder or a polymer) or other additives used in the transparent resin film are not particularly limited as long as they do not depart from the gist of the present invention. It is possible to preferably use the resin or other additives used in the second curable transparent resin layer in the transfer film of the present invention.

As the resin (referred to as a binder or a polymer) used in the first curable transparent resin layer and the second curable transparent resin layer, alkali-soluble resin is preferable. As the alkali-soluble resin, it is possible to use the polymers described in paragraph 0025 of JP2011-95716A and in paragraphs 0033 to 0052 of JP2010-237589A.

As the aforementioned polymerizable compound, the polymerizable compound described in paragraphs 0023 and 0024 of JP4098550B can be used.

As the aforementioned polymerization initiator or polymerization initiating system, it is possible to use the polymerizable compounds described in paragraphs 0031 to 0042 of JP2011-95716A.

Furthermore, additives may be used in the first curable transparent resin layer and the second curable transparent resin layer. Examples of the additives include the surfactants described in paragraph 0017 of JP4502784B and in paragraphs 0060 to 0071 of JP2009-237362A, the thermopolymerization inhibitor described in paragraph 0018 of JP4502784B, and other additives described in paragraphs 0058 to 0071 of JP2000-310706A.

As the solvent used at the time of producing the aforementioned photosensitive film by coating, it is possible to use the solvents described in paragraphs 0043 and 0044 of JP2011-95716A.

Hitherto, the case in which the transfer film of the present invention is a negative material has been mainly described. However, the transfer film of the present invention may be a positive material. When the transfer film of the present invention is a positive material, for the first curable transparent resin layer and the second curable transparent resin layer, for example, the materials described in JP2005-221726A and the like can be used, but the present invention is not limited thereto.

(First Curable Transparent Resin Layer)

In the transfer film of the present invention, the refractive index of the first curable transparent resin layer is preferably 1.5 to 1.53, more preferably 1.5 to 1.52, and particularly preferably 1.51 to 1.52.

In the transfer film of the present invention, from the viewpoint of demonstrating a sufficient surface protecting ability at the time of forming a transparent protective layer of a capacitive input device by using the first curable transparent resin layer, the thickness of the first curable transparent resin layer is preferably equal to or greater than 1 µm, more preferably 1 µm to 10 µm, even more preferably 1 µm to 5 µm, and particularly preferably 1 µm to 3 µm.

As the material of the first curable transparent resin layer, any of polymer components or any of polymerizable compound components can be used without particular limitation. However, from the viewpoint of using the first curable transparent resin layer as a transparent protective film of a capacitive input device, the materials having a high degree of surface hardness and heat resistance are preferable. Among the alkali-soluble resins or the polymerizable compounds contained in the first curable transparent resin layer and the second curable transparent resin layer, known photosensitive siloxane resin materials, acryl resin materials, and the like are preferably used.

In the transfer film of the present invention, from the viewpoint of enhancing the strength or the like of the photocured film, or from the viewpoint of increasing the double bond consumption rate of the first curable transparent resin layer by photocuring the first curable transparent resin layer during the period from when the first curable transparent resin layer has been formed to when the second curable transparent resin layer has not yet been formed and thus forming a clear interface between the first curable transparent resin layer and the second curable transparent resin layer and further improving the visibility of the transparent electrode pattern, the first curable transparent resin layer preferably contains the polymerizable compound and the polymerization initiator.

The content of the polymerization initiator in the first curable transparent resin layer is preferably equal to or greater than 1% by mass, more preferably equal to or greater than 2% by mass, and particularly preferably equal to or greater than 3% by mass, with respect to the solid content of the first curable transparent resin layer.

From the viewpoint of appropriately photocuring the first curable transparent resin layer during the period from when the first curable transparent resin layer has been formed to when the second curable transparent resin layer has not yet been formed, the content of the photopolymerization initiator in the first curable transparent resin layer is preferably greater than the content of the photopolymerization initiator in the second curable transparent resin layer. The content of the photopolymerization initiator in the first curable transparent resin layer is preferably not less than 1.5 times the content of the photopolymerization initiator in the second curable transparent resin layer, more preferably 1.5 times to 5 times the content of the photopolymerization initiator in the second curable transparent resin layer, and particularly preferably 2 times to 4 times the content of the photopolymerization initiator in the second curable transparent resin layer.

The first curable transparent resin layer may or may not contain the metal oxide particles. In order to control the refractive index of the first curable transparent resin layer within the aforementioned range, the first curable transparent resin layer can contain the metal oxide particles at any ratio, according to the type of the polymer or the polymerizable compound to be used. The content of the metal oxide particles in the first curable transparent resin layer is preferably 0% by mass to 35% by mass, more preferably 0% by mass to 10% by mass, and particularly preferably 0% by mass, with respect to the solid content of the first curable transparent resin layer.

(Second Curable Transparent Resin Layer)

The transfer film of the present invention has a second curable transparent resin layer which is disposed adjacent to the first curable transparent resin layer, and the refractive index of the second curable transparent resin layer is greater than the refractive index of the first curable transparent resin layer and equal to or greater than 1.6.

In the transfer film of the present invention, the refractive index of the second curable transparent resin layer is preferably equal to or greater than 1.65.

The upper limit of the refractive index of the second curable transparent resin layer is not particularly limited. However, the upper limit is preferably equal to or less than 1.78 for the practical use, and may be equal to or less than 1.74.

In the transfer film of the present invention, the thickness of the second curable transparent resin layer is preferably equal to or less than 500 nm, and more preferably equal to or less than 110 nm. Particularly, the thickness of the second curable transparent resin layer is preferably 55 nm to 100 nm, more preferably 60 nm 90 nm, and even more preferably 70 nm to 90 nm.

In the transfer film of the present invention, from the viewpoint of enhancing the strength or the like of the film by curing, the second curable transparent resin layer preferably contains the polymerizable compound.

The second curable transparent resin layer may or may not contain the metal oxide particles. However, from the viewpoint of controlling the refractive index of the second curable transparent resin layer within the aforementioned range, the second curable transparent resin layer preferably contains the metal oxide particles. The second curable transparent resin layer can contain the metal oxide particles at any ratio, according to the type of the polymer or the polymerizable compound to be used. However, the content of the metal oxide particles in the second curable transparent resin layer is preferably 40% by mass to 95% by mass, more preferably 55% by mass to 95% by mass, and particularly preferably 82% by mass to 90% by mass, with respect to the solid content of the second curable transparent resin layer.

<Thermoplastic Resin Layer>

In the transfer film of the present invention, a thermoplastic resin layer is preferably disposed between the temporary support and the first curable transparent resin layer. If a transparent laminate is formed by transferring the first curable transparent resin layer and the second curable transparent resin layer by using the transfer film having the thermoplastic resin layer, air bubbles are not easily generated in the respective elements formed by transfer, image unevenness and the like does not easily occur in an image display devise, and thus excellent display characteristics can be obtained.

The thermoplastic resin layer is preferably alkali-soluble. The thermoplastic resin layer functions as a cushioning material that can cover concavities and convexities (including concavities, convexities, and the like formed by an image that has already been formed) of the surface of the base. The thermoplastic resin layer preferably has properties in which it can be deformed according to the concavities and convexities on the surface of a subject.

The thermoplastic resin layer preferably adopts an embodiment containing the organic polymer substance described in JP1993-72724A (JP-H05-72724A) as a component, and particularly preferably adopts an embodiment containing at least one kind selected from among organic polymer substances of which the softening point measured by a Vicat method (specifically, a method for measuring the softening point of a polymer according to America material testing method, ASTMD1235) is about equal to or less than 80° C.

Specifically, examples of the organic polymer substances include organic polymers like polyolefins such as polyethylene and polypropylene, ethylene copolymers consisting of ethylene and vinyl acetate or a saponified product thereof, copolymers consisting of ethylene and an acrylic acid ester or a saponified product thereof, vinyl chloride copolymers consisting of polyvinyl chloride or vinyl chloride and vinyl acetate or a saponified product thereof, polyvinylidene chloride, vinylidene chloride copolymers, polystyrene, styrene copolymers consisting of styrene and a (meth)acrylic acid ester or a saponified product thereof polyvinyl toluene, vinyl toluene copolymers consisting of vinyl toluene and a (meth) acrylic acid ester or a saponified product thereof, poly(meth) acrylic acid esters, (meth)acrylic acid ester copolymers consisting of butyl(meth)acrylate and vinyl acetate and the like, vinyl acetate copolymer, nylon, copolymer nylon, polyamide resins such as N-alkoxymethylated nylon and N-dimethylaminated nylon.

The thickness of the thermoplastic resin layer is preferably 3 μm to 30 μm. If the thickness of the thermoplastic resin layer is less than 3 μm, follow-up properties at the time of lamination become sufficient, and the concavities and convexities on the surface of the base cannot be completely covered. If the thickness exceeds 30 μm, a load is applied at the time of performing drying (removing solvent) for forming the thermoplastic resin layer on the temporary support; the time taken for developing the thermoplastic resin layer is lengthened; or process suitability deteriorates in some cases. The thickness of the thermoplastic resin layer is more preferably 4 μm to 25 μm, and particularly preferably 5 μm to 20 μm.

The thermoplastic resin layer can be formed by coating a preparation containing a thermoplastic organic polymer, and the preparation used for coating and the like can be prepared using a solvent. The solvent is not particularly limited as long as it can dissolve a polymer component constituting the thermoplastic resin layer, and examples thereof include methyl ethyl ketone, cyclohexanone, propylene glycol monomethyl ether acetate (MMPGAc), n-propanol, 2-propanol, and the like.

(Viscosity of Thermoplastic Resin Layer and Photocurable Resin Layer)

The viscosity of the thermoplastic resin layer measured at 100° C. is preferably within a range of 1,000 Pa·sec to 10,000 Pa·sec, and the viscosity of the photocurable resin layer measured at 100° C. is preferably within a range of 2,000 Pa·sec to 50,000 Pa·sec. Moreover, the viscosity of each of the thermoplastic resin layer and the photocurable resin layer preferably satisfies the following Expression (A).

$$\text{viscosity of thermoplastic resin layer} < \text{viscosity of photocurable resin layer} \quad \text{Expression (A)}$$

Herein, the viscosity of each of layers can be measured in the following manner. A coating solution for a thermoplastic resin layer or for a photocurable resin layer is dried under the atmospheric pressure or under reduced pressure so as to remove the solvent and prepare a sample for measurement. Thereafter, for example, by using Vibron (DD-III model: manufactured by Toyo Baldwin Co., Ltd.) as a measurement instrument, the viscosity is measured under the conditions of a measurement start temperature of 50° C., a measurement end temperature of 150° C., a temperature increase rate of 5° C./min, and a vibration frequency of 1 Hz/deg. The value measured at 100° C. can be used as the viscosity.

<Intermediate Layer>

From the viewpoint of preventing mixing of components occurring when a plurality of layers is subjected to coating and when the plurality of layers is stored after coating, it is preferable that the transfer film of the present invention further has an intermediate layer between the first curable transparent resin layer and the thermoplastic resin layer. As the intermediate layer, an oxygen barrier film which is described as a "separation layer" in JP1993-72724A (JP-H05-72724A) and has a function of blocking oxygen is preferable. If such an intermediate layer is used, the sensitivity at the time of exposure is increased, a temporal load applied to the exposure machine can be reduced, and productivity is improved.

In the transfer film of the present invention, it is preferable that a protective film (hereinafter, also referred to as a "protective release layer") or the like is further disposed on the surface of the second curable transparent resin layer.

As the intermediate layer and the protective film, it is possible to appropriately use the intermediate layer and the protective film described in paragraphs 0083 to 0087 and 0093 of JP2006-259138A.

Figure 12:
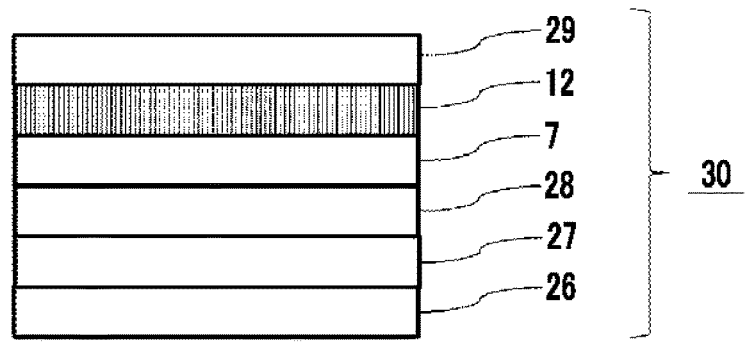
FIG. 12 is a schematic cross-sectional view showing an example of a constitution of a transfer film of the present invention.

FIG. 12 shows an example of a preferable constitution of the transfer film of the present invention. FIG. 12 is a schematic view of a transfer film 30 of the present invention in which a temporary support 26, a thermoplastic resin layer 27, an intermediate layer 28, a first curable transparent resin layer 7, a second curable transparent resin layer 12, and a protective release layer (protective film) 29 are laminated on each other in this order in a state of being adjacent to each other.

[Method for Producing Transfer Film]

The transfer film of the present invention can be prepared based on the method for preparing a photosensitive transfer material described in paragraphs 0094 to 0098 of JP2006-259138A. Particularly, the transfer film of the present invention is preferably produced by the following method for producing a transfer film of the present invention.

The method for producing a transfer film of the present invention includes (b) forming a first curable transparent resin layer containing a polymerizable compound and a photopolymerization initiator on a temporary support, (c) curing the first curable transparent resin layer by exposure, and (d) forming a second curable transparent resin layer directly on the cured first curable transparent resin layer, in which the refractive index of the second curable transparent resin layer is greater than the refractive index of the first curable transparent resin layer and equal to or greater than 1.6.

According to the above constitution, it is possible to increase the double bond consumption rate of the first curable transparent resin layer by equal to or higher than 10%, to form a clear interface between the first curable transparent resin layer and the second curable transparent resin layer, and to further improve the visibility of the transparent electrode pattern. Particularly, even when the same polymer and polymerizable compound are used in the first curable transparent resin layer and the second curable transparent resin layer, if the aforementioned constitution is adopted, a clear interface can be formed between the first curable transparent resin layer and the second curable transparent resin layer.

The method for producing a transfer film of the present invention preferably further includes (a) forming a thermoplastic resin layer before forming the first curable transparent resin layer on the temporary support.

The method for producing a transfer film of the present invention preferably further includes forming an intermediate layer between the thermoplastic resin layer and the first curable transparent resin layer after the (a) step of forming a thermoplastic resin layer. Specifically, for forming the aforementioned photosensitive film having an intermediate layer, the following method can be used. That is, a temporary support is coated with a solution (a coating solution for a thermoplastic resin layer) in which a thermoplastic organic polymer and additives have been dissolved, and the resultant is dried so as to form a thermoplastic resin layer. Thereafter, the thermoplastic resin layer is coated with a preparation (a coating solution for an intermediate layer), which is prepared by adding resin or additives to a solvent that does not dissolve the thermoplastic resin layer, and the resultant is dried such that an intermediate layer is laminated. Subsequently, the intermediate layer is coated with a coating solution for a colored photosensitive resin layer that is prepared by using a solvent which does not dissolve the intermediate layer, and the resultant is dried such that a colored photosensitive resin layer is laminated. In this way, the photosensitive film having an intermediate layer can be suitably prepared.

[Transparent Laminate]

The transparent laminate of the present invention has a transparent electrode pattern, a second curable transparent resin layer that is disposed adjacent to the transparent electrode pattern, and a first curable transparent resin layer that is disposed adjacent to the second curable transparent resin layer, in which the refractive index of the second curable transparent resin layer is greater than the refractive index of the first curable transparent resin layer and equal to or greater than 1.6.

If such a constitution is adopted, the problem in that the transparent electrode pattern is visually recognized can be resolved.

In the transparent laminate of the present invention, from the viewpoint of making it easy to form an interface between the first curable transparent resin layer and the second curable transparent resin layer, and from the viewpoint of further improving the visibility of the transparent electrode pattern, the double bond consumption rate of the first curable transparent resin layer is preferably equal to or less than 10%.

<Constitution of Transparent Laminate>

From the viewpoint of further improving the visibility of the transparent electrode pattern, the transparent laminate of the present invention preferably further has a transparent film which has a refractive index of 1.6 to 1.78 and a thickness of 55 nm to 110 nm, on a side of the transparent electrode pattern that is opposite to the side where the second curable transparent resin layer has been formed. In the present specification, unless otherwise specified, "transparent film" refers to the aforementioned "transparent film which has a refractive index of 1.6 to 1.78 and a thickness of 55 nm to 110 nm".

The transparent laminate of the present invention preferably further has a transparent substrate on a side of the transparent film, which has a refractive index of 1.6 to 1.78 and has a thickness of 55 nm to 110 nm, that is opposite to the side where the transparent electrode pattern has been formed.

Figure 11:
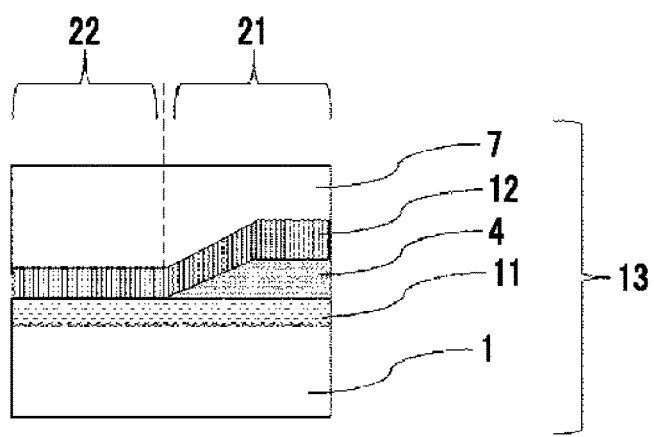
FIG. 11 is a schematic cross-sectional view showing an example of a constitution of a transparent laminate of the present invention.

FIG. 11 shows an example of a constitution of the transparent laminate of the present invention.

In FIG. 11, the transparent laminate has a transparent substrate 1 and a transparent film 11 which has a refractive index of 1.6 to 1.78 and a thickness of 55 nm to 110 nm. Moreover, the transparent laminate further includes an area 21, in which a transparent electrode pattern 4, the second curable transparent resin layer 12, and the first curable transparent resin layer 7 are laminated on each other in this order, within the plane thereof. Furthermore, the transparent laminate shown in FIG. 11 has an area in which the transparent substrate 1 and a multi-layer film 11 including at least two kinds of transparent thin films having different refractive indices have been laminated on each other in this order (in the constitution shown in FIG. 11, an area 22 in which the second curable transparent resin layer 12 and the first curable transparent resin layer 7 are laminated on each other in this order (that is, a non-pattern area 22 in which the transparent electrode pattern has not been formed)), in addition to the aforementioned area.

In other words, the substrate with the transparent electrode pattern includes the area 21, in which the transparent substrate 1, the multi-layer film 11 including at least two kinds of transparent thin films having different refractive indices, the transparent electrode pattern 4, the second curable transparent resin layer 12, and the first curable transparent resin layer 7 have been laminated on each other in this order, in the in-plane direction thereof.

The "in-plane direction" means a direction that is approximately parallel to a plane which is parallel to the transparent substrate of the transparent laminate. Accordingly, when the transparent laminate includes the area, in which the transparent electrode pattern 4, the second curable transparent resin layer 12, and the first curable transparent resin layer 7 have been laminated on each other in this order, within the plane thereof, it means that an orthograph of the area, in which the transparent electrode pattern 4, the second curable transparent resin layer 12, and the first curable transparent resin layer 7 have been laminated on each other in this order, that is projected to the plane parallel to the transparent substrate of the transparent laminate is present within the plane parallel to the transparent substrate of the transparent laminate.

When the transparent laminate of the present invention is used in the capacitive input device which will be described later, in some cases, the transparent electrode pattern is disposed as a first transparent electrode pattern and a second transparent electrode pattern, in each of two directions including a row direction and a column direction that are approximately orthogonal to each other (for example, see FIG. 3). For example, in the constitution shown in FIG. 3, the transparent electrode pattern in the transparent laminate of the present invention may be the second transparent electrode pattern 4 or a pad portion 3*a* of a first transparent electrode pattern 3. In other words, in the following description of the transparent laminate of the present invention, the transparent electrode pattern is represented by a reference numeral "4" in some cases, but the use of the transparent electrode pattern in the transparent laminate of the present invention is not limited to the second transparent electrode pattern 4 in the capacitive input device of the present invention. For example, the transparent electrode pattern may be used as the pad portion 3*a* of the first transparent electrode pattern 3.

The transparent laminate of the present invention preferably includes a non-pattern area in which the transparent electrode pattern has not been formed. In the present specification, "non-pattern area" means an area in which the transparent electrode pattern 4 has not been formed.

FIG. 11 shows an embodiment in which the transparent laminate of the present invention includes the non-pattern area 22.

The transparent laminate of the present invention preferably includes an area, in which the transparent substrate, the transparent film, and the second curable transparent resin layer have been laminated on each other in this order, within the plane thereof in at least a portion of the non-pattern area 22 in which the transparent electrode pattern has not been formed.

In the transparent laminate of the present invention, within the area in which the transparent substrate, the transparent film, and the second curable transparent resin layer have been laminated on each other in this order, the transparent film and the second curable transparent resin layer are preferably adjacent to each other.

Here, other members may be disposed in any position in other areas within the non-pattern area 22, as long as such a constitution does not depart from the gist of the present invention. For example, when the transparent laminate of the present invention is used in the capacitive input device which will be described later, a mask layer 2, an insulating layer 5, a conductive element 6, and the like shown in FIG. 1A can be laminated.

In the transparent laminate of the present invention, the transparent substrate and the transparent film are preferably adjacent to each other.

FIG. 11 shows an embodiment in which the transparent film 11 has been laminated on the transparent substrate 1, adjacent to the transparent substrate 1.

Here, as long as they do not depart from the gist of the present invention, a third transparent film may be laminated between the transparent substrate and the transparent film. For example, it is preferable that a third transparent film (not shown in FIG. 11) having a refractive index of 1.5 to 1.52 is disposed between the transparent substrate and the transparent film.

In the transparent laminate of the present invention, the thickness of the transparent film is preferably 55 nm to 110 nm, more preferably 60 nm to 110 nm, and even more preferably 70 nm to 90 nm.

The transparent film may have a single-layered structure or a laminated structure composed of two or more layers. When the transparent film has a laminated structure composed of two or more layers, the thickness of the transparent film means the total thickness of the layers.

In the transparent laminate of the present invention, the transparent film and the transparent electrode pattern are preferably adjacent to each other.

FIG. 11 shows an embodiment in which the transparent electrode pattern 4 has been laminated on the area of a portion of the transparent film 11, adjacent to the transparent film 11.

As shown in FIG. 11, the end of the transparent electrode pattern 4 may have a tapered shape, although the shape is not particularly limited. For example, the surface on the side of the transparent substrate may have a tapered shape such that the surface becomes larger than a surface on the side opposite to the transparent substrate.

When the end of the transparent electrode pattern has a tapered shape, an angle (hereinafter, also referred to as a taper angle) of the end of the transparent electrode pattern is preferably equal to or less than 30°, more preferably 0.1° to 15°, and particularly preferably 0.5° to 5°.

In the present specification, the taper angle can be measured by a method in which a photomicrograph of the end of the transparent electrode pattern is captured; the tapered portion in the photomicrograph is approximated to a triangle; and the taper angle thereof is directly measured.

Figure 10:
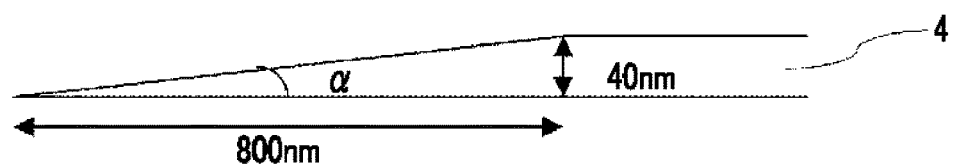
FIG. 10 is a view illustrating an example of a tapered shape of the end of the transparent electrode pattern.

FIG. 10 shows an example case in which the end of the transparent electrode pattern has a tapered shape. A triangle obtained by approximation of the tapered portion shown in FIG. 10 has a bottom side of 800 nm, a height (a thickness in an upper bottom portion approximately parallel to the bottom side) of 40 nm. At this time, a taper angle $\alpha$ is about 3°. The bottom side of the triangle obtained by approximation of the tapered portion is preferably 10 nm to 3,000 nm, more preferably 100 nm to 1,500 nm, and particularly preferably 300 nm to 1,000 nm. Herein, a preferable range of the height of the triangle obtained by approximation of the tapered portion is the same as the preferable range of the thickness of the transparent electrode pattern.

The transparent laminate of the present invention preferably includes an area in which the transparent electrode pattern and the second curable transparent resin layer are adjacent to each other.

FIG. 11 shows an embodiment in which within the area 21, in which the transparent electrode pattern, the second curable transparent resin layer, and the first curable transparent resin layer have been laminated on each other in this order, the transparent electrode pattern, the second curable transparent resin layer, and the first curable transparent resin layer are adjacent to each other.

Furthermore, in the transparent laminate of the present invention, both the transparent electrode pattern and the non-pattern area 22 in which the transparent electrode pattern has not been formed are preferably continuous and covered directly with the transparent film and the second curable transparent resin layer or covered with them through another layer.

Herein, "continuous" means that the transparent film and the second curable transparent resin layer are not patterned films but are continuous films. That is, from the viewpoint of making it difficult for the transparent electrode pattern to be visually recognized, the transparent film and the second curable transparent resin layer preferably do not have an opening portion.

The transparent electrode pattern and the non-pattern area 22 are more preferably covered directly with the transparent film and the second curable transparent resin layer rather than covered with them through another layer. When the transparent electrode pattern and the non-pattern area 22 are covered with the transparent film and the second curable transparent resin layer through another layer, examples of "another layer" include the insulating layer 5 included in the capacitive input device of the present invention that will be described later. When two or more layers of the transparent electrode pattern are included in a capacitive input device such as the capacitive input device of the present invention that will be described later, examples of "another layer" include the transparent electrode pattern as a second layer and the like.

FIG. 11 shows an embodiment in which the second curable transparent resin layer 12 has been laminated. The second curable transparent resin layer 12 has been laminated on the transparent film 11 while straddling two areas including an area in which the transparent electrode pattern 4 has not been laminated and an area in which the transparent electrode pattern 4 has been laminated. That is, the second curable transparent resin layer 12 is adjacent to the transparent film 11 and the transparent electrode pattern 4.

When the end of the transparent electrode pattern 4 has a tapered shape, the second curable transparent resin layer 12 is preferably laminated along the tapered shape (in the same slope as the taper angle).

FIG. 11 shows an embodiment in which the first curable transparent resin layer 7 has been laminated on the surface of the second curable transparent resin layer 12 that is opposite to the surface on which the transparent electrode pattern has been formed.

<Material of Transparent Laminate>

(Transparent Substrate)

In the transparent laminate of the present invention, the transparent substrate is preferably a glass substrate having a refractive index of 1.5 to 1.55. The refractive index of the transparent substrate is particularly preferably 1.5 to 1.52.

The transparent substrate is constituted with a light transmitting substrate such as a glass substrate, and for the transparent substrate, it is possible to use reinforced glass represented by Gorilla Glass from Corning Inc. Furthermore, as the transparent substrate, it is possible to preferably use the materials used in JP2010-86684A, JP2010-152809A, and JP2010-257492A.

(Transparent Electrode Pattern)

The refractive index of the transparent electrode pattern is preferably 1.75 to 2.1.

The material of the transparent electrode pattern is not particularly limited, and known materials can be used. For example, the transparent electrode pattern can be prepared by using a light-transmitting conductive metal oxide film such as ITO (Indium Tin Oxide) or IZO (Indium Zinc Oxide). Examples of the metal film include an ITO film; a film of a metal such as Al, Zn, Cu, Fe, Ni, Cr, or Mo; a film of metal oxide such as $SiO_2$; and the like. At this time, the thickness of each element can be set to be 10 nm to 200 nm. Furthermore, in order to make an amorphous ITO film into a polycrystalline ITO film by firing, electrical resistance can be reduced. Moreover, the first transparent electrode pattern 3, the second transparent electrode pattern 4, and the conductive element 6 which will be described later can be produced by using a photosensitive film having a photocurable resin layer using a conductive fiber. In addition, for forming the first conductive pattern by using ITO and the like, paragraphs 0014 to 0016 of JP4506785B and the like can be referred to. Particularly, the transparent electrode pattern is preferably an ITO film.

In the transparent laminate of the present invention, the transparent electrode pattern is preferably an ITO film having a refractive index of 1.75 to 2.1.

(First Curable Transparent Resin Layer and Second Curable Transparent Resin Layer)

A preferable range of the first curable transparent resin layer and the second curable transparent resin layer is the same as the preferable range of the first curable transparent resin layer and the second curable transparent resin layer in the transfer film of the present invention.

(Transparent Film)

In the transparent laminate of the present invention, the refractive index of the transparent film is 1.6 to 1.78 and preferably 1.65 to 1.74. Herein, the transparent film may have a single-layered structure or a laminated structure composed of two or more layers. When the transparent film has the laminated structure composed of two or more layers, the refractive index of the transparent film means the total refractive index of the layers.

As long as the above range of a refractive index is satisfied, the material of the transparent film is not particularly limited.

A preferable range of the materials of the transparent film and a preferable range of physical properties such as the refractive index of the transparent film are the same as the preferable range of the materials and the physical properties of the second curable transparent resin layer.

In the transparent laminate of the present invention, from the viewpoint of optical homogeneity, the transparent film and the second curable transparent resin layer are preferably constituted with the same material.

In the transparent laminate of the present invention, the transparent film is preferably a transparent resin film. The metal oxide particles, resin (binder), or other additives used in the transparent resin film are not particularly limited, as long as they do not depart from the gist of the present invention. It is possible to preferably use the resin or other additives used in the second curable transparent resin layer in the transfer film of the present invention.

In the transparent laminate of the present invention, the transparent film may be an inorganic film. As the material used in the inorganic film, it is possible to use materials used in the second curable transparent resin layer in the transparent film of the present invention.

(Third Transparent Film)

From the viewpoint of improving the visibility of the transparent electrode pattern, the refractive index of the third transparent film is preferably 1.5 to 1.55 which is close to the refractive index of the transparent substrate, and is more preferably 1.5 to 1.52.

[Method for Producing Transparent Laminate]

The method for producing a transparent laminate of the present invention includes laminating the second curable transparent resin layer and the first curable transparent resin layer of the transfer film of the present invention on the transparent electrode pattern in this order.

According to the above constitution, it is possible to transfer the second curable transparent resin layer and the first curable transparent resin layer of the transparent laminate in a lump and to easily produce a transparent laminate, which does not cause a problem in that the transparent electrode pattern is visually recognized, with excellent productivity.

In the method for producing a transparent laminate of the present invention, the second curable transparent resin layer is formed on the transparent electrode pattern and on the transparent film within the non-pattern area, directly or through another layer.

(Surface Treatment of Transparent Substrate)

In order to improve adhesiveness of the respective layers to be laminated in a transfer step performed later, the non-contact surface of the transparent substrate (front panel) can be subjected to surface treatment in advance. The surface treatment is preferably performed as surface treatment using a silane compound (silane coupling processing). As the silane coupling agent, compounds having functional groups interacting with photosensitive resin are preferable. For example, a silane coupling solution (a 0.3% by mass aqueous (N-β(aminoethyl)γ-aminopropyltrimethoxyxilane) solution (trade name: KBM603, manufactured by Shin-Etsu Chemical Co., Ltd.)) is sprayed to the transparent substrate for 20 seconds by shower, and then the substrate is washed with pure water by shower. Thereafter, the transparent substrate is heated to cause reaction. At this time, a heating tank may be used, and if the transparent substrate is pre-heated by a laminator, the reaction can be accelerated.

(Formation of Transparent Electrode Pattern)

The aforementioned transparent electrode pattern can be formed on the transparent substrate or on the transparent film which has a refractive index of 1.6 to 1.78 and a thickness of 55 nm to 110 nm, by the method for forming the first transparent electrode pattern 3, the second transparent electrode pattern 4, and the conductive element 6 other than these patterns described for the capacitive input device of the present invention that will be described later. The transparent electrode pattern is preferably formed by the method using a photosensitive film.

(Formation of First Curable Transparent Resin Layer and Second Curable Transparent Resin Layer)

Examples of the method for forming the first curable transparent resin layer and the second curable transparent resin layer include a method including a protective film-removing step of removing the aforementioned protective film from the transfer film of the present invention; a transfer step of transferring the first curable transparent resin layer and the second curable transparent resin layer of the transfer film of the present invention, from which the protective film has been removed, onto the transparent electrode pattern; an exposure step of performing exposure on the first curable transparent resin layer and the second curable transparent resin layer that have been transferred onto the transparent electrode pattern; and a development step of developing the first curable transparent resin layer and the second curable transparent resin layer that have undergone exposure.

—Transfer Step—

The transfer step is transferring the first curable transparent resin layer and the second curable transparent resin layer of the transfer film of the present invention, from which the protective film has been removed, onto the transparent electrode pattern.

At this time, it is preferable to use a method including laminating the first curable transparent resin layer and the second curable transparent resin layer of the transfer film of the present invention onto the transparent electrode pattern and then removing the temporary support.

The transfer (sticking) of the first curable transparent resin layer and the second curable transparent resin layer onto the surface of the substrate can be performed in a manner in which the first curable transparent resin layer and the second curable transparent resin layer are stacked on the surface of the transparent electrode pattern and then pressed under heating. For the sticking, it is possible to use known laminators such as a laminator, a vacuum laminator, and an auto cut laminator which can further improve productivity.

—Exposure Step, Development Step, and Other Steps—

As the exposure step, the development step, and other steps, for example, the methods described in paragraphs 0035 to 0051 of JP2006-23696A can also be suitably used in the present invention.

The exposure step is performing exposure on the first curable transparent resin layer and the second curable transparent resin layer that have been transferred onto the transparent electrode pattern.

Specifically, for example, the exposure step is performed by a method in which a predetermined mask is disposed on top of the first curable transparent resin layer and the second curable transparent resin layer that have been formed on the transparent electrode pattern, and then the first curable transparent resin layer and the second curable transparent resin layer are exposed to light from the top of the mask through the mask, the thermoplastic resin layer, and the intermediate layer. Alternatively, for example, the exposure step is performed by a method in which the whole surface of the first curable transparent resin layer and the second curable transparent resin layer is exposed to light through the thermoplastic resin layer and the intermediate layer without using a mask.

As a light source of for the exposure, it is possible to appropriately select and use any type of light source, as long as the light source can radiate light in a wavelength region (for example, 365 nm or 405 nm) that can cure the first curable transparent resin layer and the second curable transparent resin layer. Specific examples of the light source include an ultrahigh-pressure mercury lamp, a high-pressure mercury lamp, a metal halide lamp, and the like. The exposure amount is generally about 5 mJ/cm$^2$ to 200 mJ/cm$^2$, and is preferably about 10 mJ/cm$^2$ to 100 mJ/cm$^2$.

The development step is developing the photocurable resin layers having undergone exposure.

In the present invention, the development step is not a development step in a narrow sense in which the first curable transparent resin layer and the second curable transparent resin layer having undergone patternwise exposure are patternwise-exposed by a developer. The development step in the present invention is a development step that also includes a case in which only the thermoplastic resin layer or the intermediate layer is removed after the whole surface exposure, but the first curable transparent resin layer and the second curable transparent resin layer do not form a pattern.

The development can be performed by using a developer. The developer is not particularly limited, and it is possible to use known developers such as the developer described in JP1993-72724A (JP-H05-72724A). Furthermore, as the developer, a developer is preferable which shows developing behavior of dissolving the photocurable resin layer. For example, a developer is preferable which contains a compound having pKa of 7 to 13 at a concentration of 0.05 mol/L to 5 mol/L. In contrast, when the first curable transparent resin layer and the second curable transparent resin layer do not form a pattern, as the developer, a developer is preferable which shows developing behavior of not dissolving a non-alkali development type colored composition layer. For example, a developer is preferable which contains a compound having pKa of 7 to 13 at a concentration of 0.05 mol/L to 5 mol/L. A small amount of an organic solvent mixable with water may be further added to the developer. Examples of the organic solvent mixable with water include methanol, ethanol, 2-propanol, 1-propanol, butanol, diacetone alcohol, ethylene glycol monomethyl ether, ethylene glycol monoethyl ether, ethylene glycol mono-n-butyl ether, benzyl alcohol, acetone, methyl ethyl ketone, cyclohexanone, ε-caprolactone, γ-butyrolactone, dimethylformamide, dimethylacetamide, hexamethylphosphoramide, ethyl lactate, methyl lactate, ε-caprolactam, N-methylpyrrolidone, and the like. The concentration of the organic solvent is preferably 0.1% by mass to 30% by mass. Moreover, a known surfactant can be further added to the developer. The concentration of the surfactant is preferably 0.01% by mass to 10% by mass.

The development may be performed by any method such as paddle development, shower development, shower and spin development, and dipping development. The shower development is a method of spraying a developer to the first curable transparent resin layer and the second curable transparent resin layer having undergone exposure by shower, and in this way, an uncured portion can be removed. When the thermoplastic resin layer or the intermediate layer is disposed in the transparent laminate, it is preferable to remove the thermoplastic resin layer, the intermediate layer, or the like in advance by spraying alkaline liquid, which poorly dissolves the photocurable resin layers, by shower or the like before the development. Furthermore, after the development, it is preferable to remove the development residues by spraying a washer or the like to the first and second curable transparent resin layers by shower and rubbing the first and second curable transparent resin layers with a brush or the like. The temperature of the developer is preferably 20° C. to 40° C., and pH of the developer is preferably 8 to 13.

The method for producing a capacitive input device may further include other steps such as a post-exposure step and a post-baking step. When the first curable transparent resin layer and the second curable transparent resin layer are thermosetting transparent resin layers, it is preferable to perform the post-baking step.

The patterning exposure or the whole surface exposure may be performed after the temporary support is peeled. Alternatively, the exposure may be performed before the temporary support is peeled, and then the temporary support may be peeled. The exposure may be performed through a mask, or may be performed in the form of digital exposure using laser or the like.

(Formation of Transparent Film)

When the transparent laminate of the present invention further has the transparent film, which has a refractive index of 1.6 to 1.78 and a thickness of 55 nm to 110 nm, on a side of the transparent electrode pattern that is opposite to the side where the second curable transparent resin layer has been formed, the transparent film is formed on the transparent electrode pattern, directly or through another layer such as the aforementioned third transparent film.

The method for forming the transparent film is not particularly limited. However, it is preferable to form the transparent film by means of transfer or sputtering.

Particularly, in the transparent laminate of the present invention, the transparent film is preferably formed by transferring the curable transparent resin layer formed on the temporary support onto the aforementioned transparent substrate, and more preferably formed by transfer followed by curing. Examples of the method of the transfer and curing include a method in which the transfer, exposure, development, and other steps are performed as in the method of transferring the first curable transparent resin layer and the second curable transparent resin layer in the method for producing a transparent laminate of the present invention by using the photosensitive film described for the capacitive input device of the present invention that will be described later. In this case, it is preferable to adjust the refractive index of the transparent film within the aforementioned range by dispersing the aforementioned metal oxide particles in the photocurable resin layer in the photosensitive film.

In contrast, when the transparent film is an inorganic film, the transparent film is preferably formed by sputtering. That is, in the transparent laminate of the present invention, the transparent film is preferably formed by sputtering.

As the sputtering method, it is possible to preferably use the methods used in JP2010-86684A, JP2010-152809A, and JP2010-257492A.

(Formation of Third Transparent Film)

The method for forming the third transparent film is the same as the method for forming the transparent film, which has a refractive index of 1.6 to 1.78 and a thickness of 55 nm to 110 nm, on the transparent substrate.

[Capacitive Input Device]

The capacitive input device of the present invention is prepared by using the transfer film of the present invention, or includes the transparent laminate of the present invention.

The capacitive input device of the present invention preferably has a transparent laminate having a transparent electrode pattern, a second curable transparent resin layer that is disposed adjacent to the transparent electrode pattern, and a first curable transparent resin layer that is disposed adjacent to the second curable transparent resin layer, in which the refractive index of the second curable transparent resin layer is greater than refractive index of the first curable transparent resin layer and equal to or greater than 1.6.

Hereinafter, preferable embodiments of the capacitive input device of the present invention will be specifically described.

The capacitive input device of the present invention preferably has a front panel (corresponding to the transparent substrate in the transparent laminate of the present invention), at least the following elements (3) to (5), (7), and (8) on the side of a non-contact surface of the front panel, and the transparent laminate of the present invention.

(3) A plurality of first transparent electrode patterns in which a plurality of pad portions has been formed in a state of extending in a first direction through connection portions (4) A plurality of second electrode patterns which is electrically insulated from the first transparent electrode patterns and composed of a plurality of pad portions formed in a state of extending in a direction crossing the first direction (5) An insulating layer which electrically insulates the first transparent electrode patterns from the second electrode patterns (7) A second curable transparent resin layer formed to completely or partially cover the elements (3) to (5)

(8) A first curable transparent resin layer formed adjacent to the element (7) so as to cover the element (7)

Herein, the (7) second curable transparent resin layer corresponds to the second curable transparent resin layer in the transparent laminate of the present invention. Furthermore, the (8) first curable transparent resin layer corresponds to the first curable transparent resin layer in the transparent laminate of the present invention. Moreover, the first curable transparent resin layer is preferably a so-called transparent protective layer in generally known capacitive input devices.

In the capacitive input device of the present invention, the (4) second electrode patterns may or may not be transparent electrode patterns. However, they are preferably transparent electrode patterns.

The capacitive input device of the present invention may further include (6) a conductive element which is electrically connected to at least one of the first transparent electrode patterns and the second electrode patterns and different from the first transparent electrode patterns and the second electrode patterns.

Herein, when the (4) second electrode patterns are not transparent electrode patterns, and the capacitive input device of the present invention does not have the (6) conductive element different from the first and second electrode patterns, the (3) first transparent electrode patterns correspond to the transparent electrode pattern in the transparent laminate of the present invention.

When the (4) second electrode patterns are transparent electrode patterns, and the transparent laminate of the present invention does not have the (6) conductive element different from the first and second electrode patterns, at least one of the (3) first transparent electrode patterns and the (4) second electrode patterns corresponds to the transparent electrode pattern in the transparent laminate of the present invention.

When the (4) second electrode patterns are not transparent electrode patterns, and the transparent laminate of the present invention has the (6) conductive element different from the first and second electrode patterns, at least one of the (3) first transparent electrode patterns and the (6) conductive element different from the first and second electrode patterns corresponds to the transparent electrode pattern of the transparent laminate of the present invention.

When the (4) second electrode patterns are transparent electrode patterns, and the transparent laminate of the present invention does not have the (6) conductive element different from the first and second electrode patterns, at least one of the (3) first transparent electrode patterns, the (4) second electrode patterns, and the (6) conductive element different from the first and second electrode patterns corresponds to the transparent electrode pattern in the transparent laminate of the present invention.

The capacitive input device of the present invention preferably further includes (2) a transparent film between the (3) first transparent electrode patterns and the front panel, between the (4) second electrode patterns and the front panel, or between the (6) conductive element, which is different from the first and second electrode patterns, and the front panel. Herein, from the viewpoint of further improving the visibility of the transparent electrode patterns, the (2) transparent film preferably corresponds to the transparent film, which has a refractive index of 1.6 to 1.78 and a thickness of 55 nm to 110 nm, in the transparent laminate of the present invention.

If necessary, the capacitive input device of the present invention preferably further has either or both of (1) a mask layer and a decorative layer. The mask layer is provided in the form of a black frame around the area touched with a finger, a stylus, or the like, for the purpose of preventing routing wiring of the transparent electrode patterns from being visually recognized from the contact side or for the purpose of decoration. The decorative layer is provided for decoration, and for example, it is preferable to provide a white decorative layer.

Either or both of the (1) mask layer and the decorative layer are preferably disposed between the (2) transparent film and the front panel, between the (3) first transparent electrode patterns and the front panel, between the (4) second transparent electrode patterns and the front panel, or between the (6) conductive element, which is different from the first transparent electrode patterns and the second electrode patterns, and the front panel. Either or both of the (1) mask layer and the decorative layer are more preferably disposed adjacent to the front panel.

Even when the capacitive input device of the present invention includes the various members described above, because the capacitive input device includes the second curable transparent resin layer disposed adjacent to the transparent electrode patterns and the first curable transparent resin layer disposed adjacent to the second curable transparent resin layer, it is possible to prevent the transparent electrode patterns from becoming noticeable and to improve the problem of visibility of the transparent electrode patterns. Furthermore, as described above, because the capacitive input device adopts a constitution in which the transparent electrode patterns are interposed between the transparent film, which has a refractive index of 1.6 to 1.78 and a thickness of 55 nm to 110 nm, and the second curable transparent resin layer, it is possible to greatly improve the problem of visibility of the transparent electrode patterns.

<Constitution of Capacitive Input Device>

First, preferable embodiments of the capacitive input device of the present invention will be described in relation to methods for producing the respective members constituting the device. FIG. 1A is a cross-sectional view showing a preferable constitution of the capacitive input device of the present invention. FIG. 1A shows an embodiment in which a capacitive input device 10 is constituted with the transparent substrate (front panel) 1, the mask layer 2, the transparent film 11 which has a refractive index of 1.6 to 1.78 and a thickness of 55 nm to 110 nm, first transparent electrode patterns 3, second transparent electrode patterns 4, the insulating layer 5, the conductive element 6, the second curable transparent resin layer 12, and the first curable transparent resin layer 7.

Figure 1B:
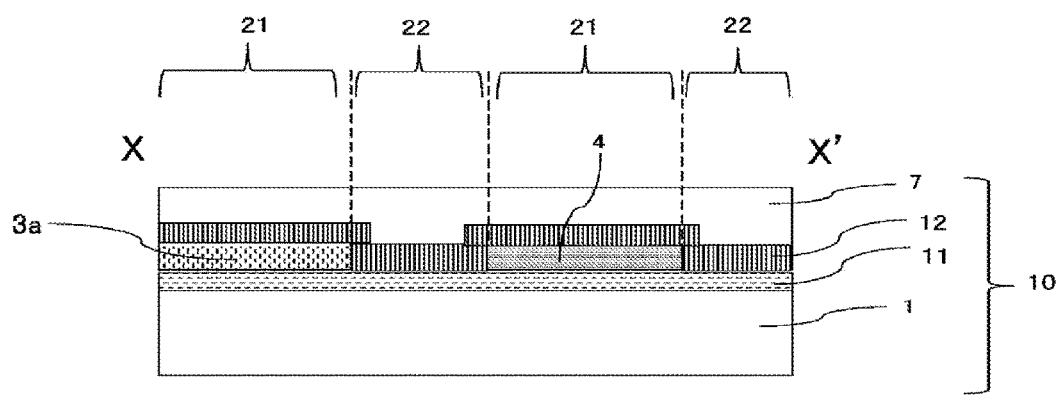
FIG. 1B is a schematic cross-sectional view showing another example of the constitution of the capacitive input device of the present invention.

FIG. 1B as a cross-sectional view taken along the line X-X' in FIG. 3, which will be described later, and also shows a preferable constitution of the capacitive input device of the present invention. FIG. 1B shows an embodiment in which the capacitive input device 10 is constituted with the transparent substrate (front panel) 1, the transparent film 11 which has a refractive index of 1.6 to 1.78 and a thickness of 55 nm to 110 nm, the first transparent electrode patterns 3, the second transparent electrode patterns 4, the second curable transparent resin layer 12, and the first curable transparent resin layer 7.

As the material of the transparent substrate (front panel) 1, it is possible to use those exemplified as the materials of the transparent electrode pattern in the transparent laminate of the present invention. In FIG. 1A, the side where the respective elements of the front panel 1 are disposed is referred to as a side of a non-contact surface. In the capacitive input device 10 of the present invention, a contact surface (a surface opposite to the non-contact surface) of the front panel 1 is brought into contact with a finger or the like, and in this way, an input operation is performed.

The mask layer 2 is disposed on the non-contact surface of the front panel 1. The mask layer 2 is a pattern in the form of a frame around a display area formed on the side of the non-contact surface of the front panel of a touch panel. The mask layer 2 is formed to prevent the routing wiring or the like from being visually recognized.

Figure 2:
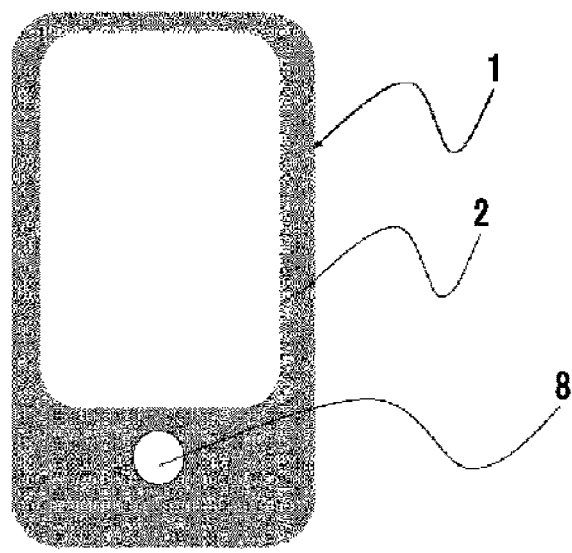
FIG. 2 is a view illustrating an example of a front panel in the present invention.

As shown in FIG. 2, in the capacitive input device 10 of the present invention, the mask layer 2 is disposed in a partial area (an area other than an input surface in FIG. 2) of the front panel 1. Furthermore, as shown in FIG. 2, an opening portion 8 can be disposed in a portion of the front panel 1. A pressing-type mechanical switch can be installed in the opening portion 8.

A plurality of the first transparent electrode patterns 3 in which a plurality of pad portions has been formed in a state of extending in a first direction through connection portions, a plurality of the second transparent electrode patterns 4 which is electrically insulated from the first transparent electrode patterns 3 and composed of a plurality of pad portions formed in a state of extending in a direction crossing the first direction, and the insulating layer 5 which electrically insulates the first transparent electrode patterns 3 from the second transparent electrode patterns 4 have been formed in the contact surface of the front panel 1. As the material of the first transparent electrode patterns 3, the second transparent electrode patterns 4, and the conductive element 6 which will be described later, it is possible to use those exemplified as the material of the transparent electrode pattern in the transparent laminate of the present invention. The material is preferably an ITO film.

At least one of the first transparent electrode patterns 3 and the second transparent electrode patterns 4 can be installed in a state of straddling two areas including the non-contact surface of the front panel 1 and the surface of the mask layer 2 that is opposite to the front panel 1. FIG. 1A shows a state in which the second transparent electrode patterns are installed in a state of straddling two areas including the non-contact surface of the front panel 1 and the surface of the mask layer 2 that is opposite to the front panel 1. In this way, even when the photosensitive film is laminated in a state of straddling two areas including the mask layer, which needs to have a certain thickness, and the back surface of the front panel, if a photosensitive film having a specific layer constitution, which will be described later, is used, even though expensive facilities such as a vacuum laminator is not used, it is possible to laminate the photosensitive film by a simple step without causing bubbles to be generated in the boundary of the mask portion.

The first transparent electrode patterns 3 and the second transparent electrode patterns 4 will be described based on FIG. 3. FIG. 3 is a view illustrating an example of the first transparent electrode patterns and the second transparent electrode patterns in the present invention. As shown in FIG. 3, in the first transparent electrode patterns 3, the pad portions 3a are formed in a state of extending in the first direction through connection portions 3b. The second transparent electrode patterns 4 are electrically insulated from the first transparent electrode patterns 3 by the insulating layer 5 and constituted with a plurality of pad portions formed in a state of extending in a direction (a second direction in FIG. 3) crossing the first direction. For forming the first transparent electrode patterns 3, the pad portions 3a and the connection portions 3b may be integrally prepared. Alternatively, only the connection portions 3b may be prepared, and then the pad portions 3a and the second transparent electrode patterns 4 may be integrally prepared (patterned). When the pad portions 3a and the second transparent electrode patterns 4 are integrally prepared (patterned), the respective layers are formed such that, as shown in FIG. 3, a portion of the connection portions 3b is linked to a portion of the pad portions 3a, and the first transparent electrode patterns 3 are electrically insulated from the second transparent electrode patterns 4 by the insulating layer 5.

Figure 3:
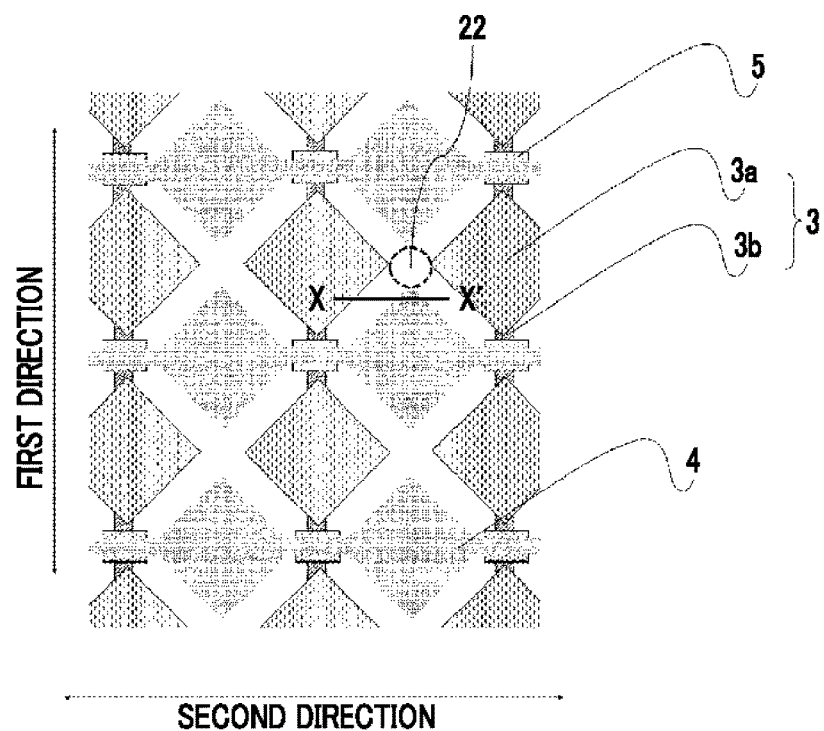
FIG. 3 is a view illustrating an example of a relationship between a transparent electrode pattern and a non-pattern area in the present invention.

In FIG. 3, the area, in which the first transparent electrode patterns 3, the second transparent electrode patterns 4, or the conductive element 6 which will be described later has not been formed, corresponds to the non-pattern area 22 in the transparent laminate of the present invention.

In FIG. 1A, the conductive element 6 has been installed on the side of the surface of the mask layer 2 that is opposite to the front panel 1. The conductive element 6 is an element which is electrically connected to at least one of the first transparent electrode patterns 3 and the second transparent electrode patterns 4 and is different from the first transparent electrode patterns 3 and the second transparent electrode patterns 4. FIG. 1A shows a state in which the conductive element 6 is connected to the second transparent electrode patterns 4.

Furthermore, in FIG. 1A, the first curable transparent resin layer 7 has been installed to cover all of the constituents. The first curable transparent resin layer 7 may be constituted so as to cover only a portion of the respective constituents. The insulating layer 5 and the first curable transparent resin layer 7 may be formed of the same material or different materials. As the material constituting the insulating layer 5, it is possible to preferably use those exemplified the material of the first or second curable transparent resin layer in the transparent laminate of the present invention.

<Method for Producing Capacitive Input Device>

Figure 4:
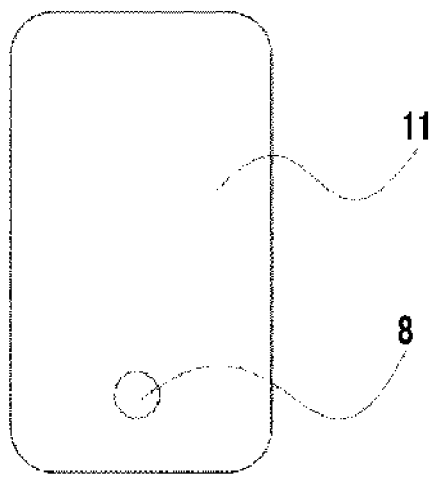
FIG. 4 is a top view showing an example of reinforced glass in which an opening portion has been formed.
Figure 5:
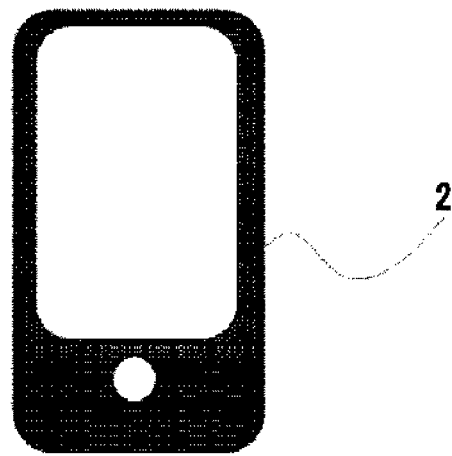
FIG. 5 is a top view showing an example of a front panel in which a mask layer has been formed.
Figure 6:
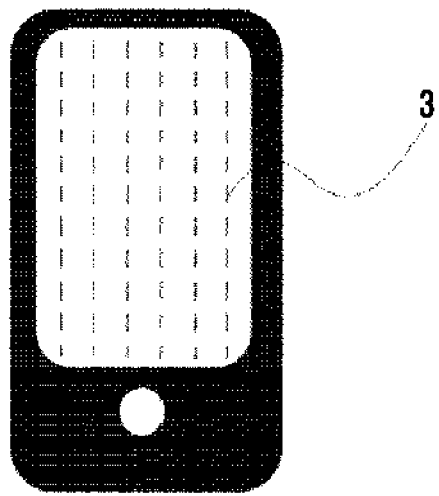
FIG. 6 is a top view showing an example of a front panel in which a first transparent electrode pattern has been formed.
Figure 7:
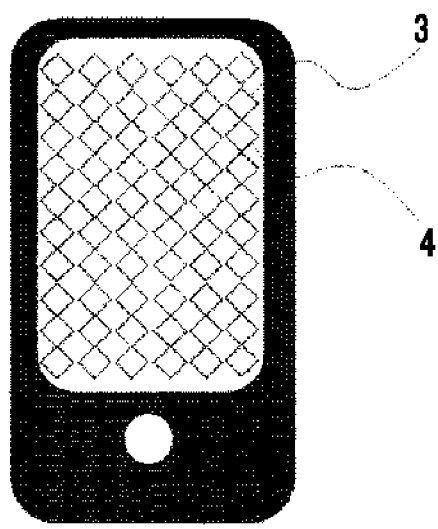
FIG. 7 is a top view showing an example of a front panel in which first and second transparent electrode patterns have been formed.
Figure 8:
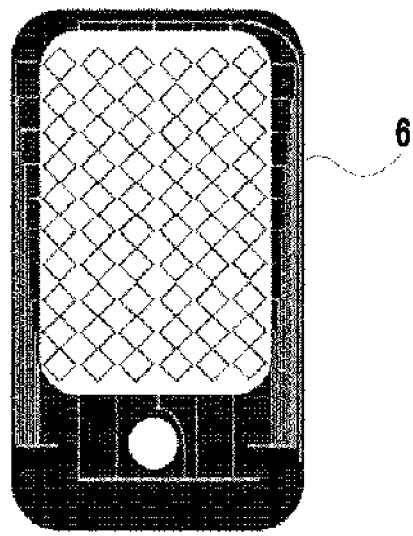
FIG. 8 is a top view showing an example of a front panel in which a conductive element different from the first and second transparent electrode patterns has been formed.

Examples of embodiments formed in the process of producing the capacitive input device of the present invention include the embodiments shown in FIGS. 4 to 8. FIG. 4 is a top view showing an example of reinforced glass 11 in which the opening portion 8 has been formed. FIG. 5 is a top view showing an example of a front panel in which the mask layer 2 has been formed. FIG. 6 is a top view showing an example of a front panel in which the first transparent electrode patterns 3 have been formed. FIG. 7 is a top view showing an example of a front panel in which the first transparent electrode patterns 3 and the second transparent electrode patterns 4 have been formed. FIG. 8 is a top view showing an example of a front panel in which the conductive element 6, which is different from the first and second transparent electrode patterns, has been formed. These drawings show examples of the following description that has been specifically embodied, and the scope of the present invention is not limited to the drawings.

When the second curable transparent resin layer 12 and the first curable transparent resin layer 7 are formed in the method for producing a capacitive input device, they can be formed by transferring the second curable transparent resin layer and the first curable transparent resin layer onto the surface of the front panel 1, in which the respectively elements have been randomly formed, by using the transfer film of the present invention.

In the method for producing a capacitive input device, at least one of the elements including the mask layer 2, the first transparent electrode patterns 3, the second transparent electrode patterns 4, the insulating layer 5, and the conductive element 6 is preferably formed by using the aforementioned photosensitive film having the temporary support and the photocurable resin layer in this order.

If the respective elements are formed by using the transfer film of the present invention or the photosensitive film, it is possible to produce a touch panel in the form of a thin and light layer by a simple step, without causing a resist component to leak from an opening portion of the substrate (front panel) even when the substrate has the opening portion and without causing the resist component to stick (leak) out of the edge of glass and thus contaminate the back side of the front panel particularly in a mask layer in which a light-shielding pattern needs to be formed up to a portion immediately above the boundary line of the front panel.

In a case of using the mask layer, the insulating layer, and the conductive photocurable resin layers, if the permanent materials such as the first transparent electrode patterns, the second transparent electrode patterns, and the conductive element are formed by using the photosensitive film, the photosensitive film is laminated on a substrate and then subjected to patternwise exposure if necessary. Thereafter, if the photosensitive film is a negative material, an unexposed portion is removed by development processing, and if the photosensitive film is a positive material, an exposed portion is removed by development processing, and in this way, a pattern can be obtained. During the development, the thermoplastic resin layer and the photocurable resin layer may be developed and removed by using different developers or the same developer. If necessary, known development facilities such as a brush and high-pressure jet may be used in combination. If necessary, after the development, post-exposure and post-baking may be performed.

(Photosensitive Film)

The photosensitive film other than the transfer film of the present invention that is preferably used for producing the capacitive input device of the present invention will be described. The photosensitive film preferably has a temporary support, a photocurable resin layer, and a thermoplastic resin layer between the temporary support and the photocurable resin layer. If a mask layer and the like are formed by using the photosensitive film having the thermoplastic resin layer, air bubbles are not easily generated in the element formed by the transfer of the photocurable resin layer, image unevenness or the like does not easily occur in an image display device, and excellent display characteristics can be obtained.

The photosensitive film may be a negative material or a positive material.

—Layer Other than Photocurable Resin Layer and Method for Preparing the Layer—

As the temporary support and the thermoplastic resin layer in the photosensitive film, it is possible to use the same thermoplastic resin layer as used in the transfer film of the present invention. Moreover, as the method for preparing the photosensitive film, it is possible to use the same method as the method for preparing the transfer film of the present invention.

—Photocurable Resin Layer—

According to the use of the photosensitive film, additives are added to the photocurable resin layer. That is, when the photosensitive film is used for forming the mask layer, a colorant is contained in the photocurable resin layer. Furthermore, when the photosensitive film has a conductive photocurable resin layer, conductive fiber and the like are contained in the photocurable resin layer.

When the photosensitive film is a negative material, the photocurable resin layer preferably contains alkali-soluble resin, a polymerizable compound, a polymerization initiator, or a polymerization initiating system. Moreover, conductive fiber, a colorant, other additives, and the like are used, but the present invention is not limited to these.

—Alkali-Soluble Resin, Polymerizable Compound, Polymerization Initiator, or Polymerization Initiating System—

As the alkali-soluble resin, the polymerizable compound, the polymerization initiator, or the polymerization initiating system contained in the photosensitive film, it is possible to use the same alkali-soluble resin, polymerizable compound, polymerization initiator, or polymerization initiating system as used in the transfer film of the present invention.

—Conductive Fiber (in a Case of using Photosensitive Layer as Conductive Photocurable Resin Layer)—

When the photosensitive film, on which the conductive photocurable resin layer has been laminated, is used for forming the transparent electrode pattern or for forming other conductive elements, the following conductive fiber and the like can be used in the photocurable resin layer.

The structure of the conductive fiber is not particularly limited and can be appropriately selected according to the purpose. However, the structure is preferably either a solid structure or a hollow structure.

Herein, the fiber having a solid structure is referred to as a "wire" in some cases, and the fiber having a hollow structure is referred to as a "tube" in some cases. Moreover, the conductive fiber having an average minor axis length of 1 nm to 1,000 nm and an average major axis length of 1 μm to 100 μm is referred to as a "nanowire" in some cases.

Furthermore, the conductive fiber having an average minor axis length of 1 nm to 1,000 nm and an average major axis length of 0.1 μm to 1,000 μm and having a hollow structure is referred to as a "nanotube" in some cases.

The material of the conductive fiber is not particularly limited as long as the material has conductivity, and can be appropriately selected according to the purpose. The material is preferably at least one of the metals and carbon, and among these, at least one of the metal nanowire, metal nanotube, and carbon nanotube is particularly preferable as the conductive fiber.

The material of the metal nanowire is not particularly limited. For example, at least one kind of metal selected from a group consisting of metals of the fourth period, the fifth period, and the sixth period of the long periodic table (IUPAC 1991) is preferable; at least one kind of metal selected from among group 2 to group 14 is more preferable; and at least one kind of metal selected from among group 2, group 8, group 9, group 10, group 11, group 12, group 13, and group 14 is even more preferable. The metal nanowire particularly preferably contains these metals as a main component.

Examples of the metal include copper, silver, gold, platinum, palladium, nickel, tin, cobalt, rhodium, iridium, iron, ruthenium, osmium, manganese, molybdenum, tungsten, niobium, tantalum, titanium, bismuth, antimony, lead, an alloy of these, and the like. From the viewpoint of excellent conductivity, a metal nanowire containing silver as a main component among these metals or a metal nanowire containing an alloy composed of silver and other metals is preferable.

When the metal nanowire contains silver as a main component, it means that the content of the silver in the metal nanowire is equal to or greater than 50% by mass and preferably equal to or greater than 90% by mass.

Examples of the metal used in the form of an alloy with silver include platinum, osmium, palladium, iridium, and the like. One kind of these metals may be used singly, or two or more kinds thereof used concurrently.

The shape of the metal nanowire is not particularly limited and can be appropriately selected according to the purpose. For example, the metal nanowire can have any of the shape of cylinder, rectangle, and column having a polygonal cross-section. However, if it is used for the purpose requiring a high degree of transparency, the metal nanowire preferably has a cylindrical shape or a shape having cross-sectional shape with rounded corner.

The cross-sectional shape of the metal nanowire can be analyzed by coating a substrate with a water dispersion of metal nanowire and observing the cross-section of the nanowire by using a transmission electron microscope (TEM).

Figure 9:
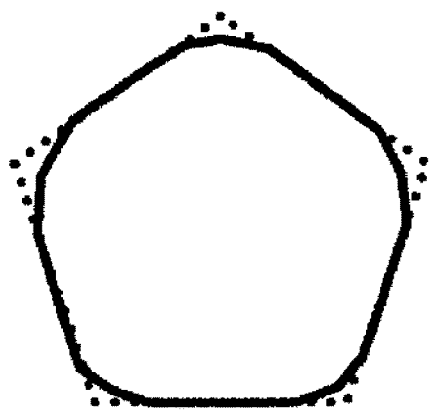
FIG. 9 is a view illustrating the cross-section of a metal nanowire.

Regarding the corner of the cross-section of the metal nanowire, when each side of the cross-section is extended, there is a point that meets perpendicular lines drawn from the sides adjacent to each other, and at this time, the portion in the vicinity of the point is the corner. Moreover, "each side of the cross-section" refers to a straight line by which the corners adjacent to each other are connected to each other. In this case, a ratio of the "outer circumferential length of the cross-section" to the total length of the "each side of the cross-section" is taken as sharpness. For example, in the cross-section of the metal nanowire shown in FIG. 9, the sharpness can be represented by the ratio between the outer circumferential length of the cross-section indicated by a solid line and the outer circumferential length of the pentagon indicated by a dotted line. If the sharpness of a cross-sectional shape is equal to or less than 75%, the shape is defined as a round cross-sectional shape. The sharpness is preferably equal to or less than 60%, and more preferably equal to or less than 50%. If the sharpness exceeds 75%, electrons may be localized in the corner, or plasmon absorption may be accelerated, and accordingly, transparency deteriorates in some cases since yellow tinge remains. In addition, linearity of the edge portion of the pattern deteriorates, and thus wobbling occurs in some cases. The lower limit of the sharpness is preferably 30%, and more preferably 40%.

The average minor axis length (referred to as "average manor axis diameter" or "average diameter" in some cases) of the metal nanowire is preferably equal to or less than 150 mm, more preferably 1 nm to 40 nm, even more preferably 10 nm to 40 nm, and particularly preferably 15 nm to 35 nm.

If the average minor axis length is less than 1 nm, oxidation resistance deteriorates, and thus durability deteriorates in some cases. If it exceeds 150 nm, light is scattered due to the metal nanowire, and thus sufficient transparency cannot be obtained in some cases.

In order to measure the average minor axis length of the metal nanowire, 300 metal nanowires are observed with a transmission electron microscope (TEM; manufactured by JEOL, Ltd., JEM-2000FX), and from the average thereof, the average minor axis length of the metal nanowires is determined. When the minor axis of the metal nanowire is not circular, the greatest length is taken as the minor axis.

The average major axis length (also referred to as "average length" in some cases) of the metal nanowire is preferably 1 μm to 40 μm, more preferably 3 μm to 35 μm, and even more preferably 5 μm to 30 μm.

If the average major axis length is less than 1 μm, it is difficult to form a dense network, and thus sufficient conductivity cannot be obtained in some cases. If it exceeds 40 μm, the metal nanowire is tangled since it is too long, and thus aggregates are generated in the production process in some cases.

In order to measure the average major axis length of the metal nanowire, 300 metal nanowires are observed with a transmission electron microscope (TEM; manufactured by JEOL, Ltd., JEM-2000FX), and from the average thereof, the average major axis length of the metal nanowires is determined. When the metal nanowire is curved, a circle having the curve as an arc is imagined, and the value calculated from the radius and curvature thereof is taken as the major axis length.

From the viewpoint of process suitability including stability of the coating solution, drying at the time of coating, and development time at the time of patterning, the thickness of the conductive photocurable resin layer is preferably 0.1 μm to 20 μm, more preferably 0.5 μm to 18 μm, and particularly preferably 1 μm to 15 μm. From the viewpoint of the conductivity and stability of the coating solution, the content of the conductive fiber with respect to the total solid content of the conductive photocurable resin layer is preferably 0.01% by mass to 50% by mass, more preferably 0.05% by mass to 30% by mass, and particularly preferably 0.1% by mass to 20% by mass.

—Colorant (in a Case of using Photosensitive Film as Mask Layer)—

When the photosensitive film is used as the mask layer, a colorant can be used in the photocurable resin layer. As the colorant used in the present invention, known colorants (organic pigments, inorganic pigments, dyes, and the like) can be suitably used. Furthermore, in the present invention, in addition to a black colorant, a mixture of pigments of red, blue, green and the like can be used.

When the photocurable resin layer is used as a black mask layer, from the viewpoint of optical density, the photocurable resin layer preferably contains a black colorant. Examples of the black colorant include carbon black, titanium carbon, iron oxide, titanium oxide, graphite, and the like, and among these, carbon black is preferable.

When the photocurable resin layer is used as a white mask layer, it is possible to use the white pigments described in paragraph 0015 or 0114 of JP2005-7765A. In order to use the photocurable resin layer as a mask layer of other colors, the pigments or dyes described in paragraphs 0183 to 0185 of JP4546276B and the like may be used by being mixed together. Specifically, the pigments and dyes described in paragraphs 0038 to 0054 of JP2005-17716A, the pigments described in paragraphs 0068 to 0072 of JP2004-361447A, the colorants described in paragraphs 0080 to 0088 of JP2005-17521A, and the like can be suitably used.

The colorant (preferably a pigment and more preferably carbon black) is desirably used in the form of dispersion. The dispersion can be prepared by adding a composition, which is obtained by premixing the colorant with a pigment dispersant, to an organic solvent (or vehicle) which will be described later, and dispersing the resultant. The "vehicle" refers to the fraction of medium, in which a pigment has dispersed, in a coating material staying in liquid form. The vehicle includes a component (a binder), which is in liquid form and forms a coating film by binding to the pigment, and a component (an organic solvent) which dissolves and dilutes the binder.

A disperser used for dispersing the pigment is not particularly limited, and examples thereof include known dispersers such as a kneader, a roll mill, an attritor, a super mill, a dissolver, a homomixer, and a sand mill described on page 438 of "Dictionary of Pigments", Kunizo Asakura, 1$^{st}$ edition, Asakura Publishing Co., Ltd., 2000. Furthermore, the pigment may be finely pulverized by means of mechanical grinding described on page 310 of the same document by using frictional force.

From the viewpoint of dispersion stability, the number average particle size of the colorant is preferably 0.001 μm to 0.1 μm, and more preferably 0.01 μm to 0.08 μm. Herein, "particle size" refers to the diameter obtained when images of the particles shown in an electromicrograph are regarded as being circles having the same area. Furthermore, "number average particle size" refers to a value determined by measuring the particle size of a large number of particles and calculating the average of 100 particles randomly selected.

From the viewpoint of a difference in the thickness between the photocurable resin layer containing the colorant and other layers, the thickness of the photocurable resin layer is preferably 0.5 µm to 10 µm, more preferably 0.8 µm to 5 µm, and particularly preferably 1 µm to 3 µm. The content of the colorant in the solid content of the colored photosensitive resin composition is not particularly limited. However, from the viewpoint of sufficiently shortening the time taken for development, the content of the colorant is preferably 15% by mass to 70% by mass, more preferably 20% by mass to 60% by mass, and even more preferably 25% by mass to 50% by mass.

In the present specification, "total solid content" means the total mass of nonvolatile components in the colored photosensitive resin composition excluding a solvent and the like.

When the insulating layer is formed by using the photosensitive film, from the viewpoint of maintaining insulating properties, the thickness of the photocurable resin layer is preferably 0.1 µm to 5 µm, more preferably 0.3 µm to 3 µm, and particularly preferably 0.5 µm to 2 µm.

—Other Additives—

In addition, other additives may be used in the photocurable resin layer. As the additives, it is possible to use the same additives as used in the transfer film of the present invention.

Furthermore, as the solvent used for producing the photosensitive film by means of coating, it is possible to use the same solvent as used for the transfer film of the present invention.

Hitherto, the case in which the photosensitive film is a negative material has been mainly described, but the photosensitive film may be a positive material. When the photosensitive film is a positive material, for example, the materials described in JP2005-221726A and the like are used in the photocurable resin layer, but the present invention is not limited thereto.

(Formation of Mask Layer and Insulating Layer by using Photosensitive Film)

The mask layer 2 and the insulating layer 5 can be formed by transferring the photocurable resin layer onto the front panel 1 or the like by using the photosensitive film. For example, a black mask layer 2 can be formed by transferring a black photocurable resin layer onto the surface of the front panel 1 by using the photosensitive film having the black photocurable resin layer as the photocurable resin layer. The insulating layer 5 can be formed by transferring the photocurable resin layer onto the surface of the front panel 1 in which the first transparent electrode patterns have been formed, by using the photosensitive film having the photocurable resin layer having insulating properties as the aforementioned photocurable resin layer.

Moreover, if the photosensitive film, which has a specific layer constitution in which the thermoplastic resin layer is disposed between the photocurable resin layer and the temporary support, is used for forming the mask layer 2 that needs to have light-shielding properties, it is possible to prevent air bubbles from being generated at the time of laminating the photosensitive film and to form the high-quality mask layer 2 or the like that does not cause the leakage of light.

(Formation of First and Second Transparent Electrode Patterns and Conductive Element Different from These Patterns by using Photosensitive Film)

The first transparent electrode patterns 3, the second transparent electrode patterns 4, and the conductive element 6 different from these patterns can be formed by etching processing. Alternatively, they can be formed by using the photosensitive film having the conductive photocurable resin layer or using the photosensitive film as a lift-off material.

—Etching Processing—

For forming the first transparent electrode patterns 3, the second transparent electrode patterns 4, and the conductive element 6 different from these patterns are formed by etching processing, first, on the non-contact surface of the front panel 1 on which the mask layer 2 or the like has been formed, a transparent electrode layer of ITO or the like is formed by sputtering. Next, on the transparent electrode layer, by using the photosensitive film which has a photocurable resin layer for etching as the photocurable resin layer, an etching pattern is formed by means of exposure and development. Thereafter, the transparent electrode layer is etched so as to pattern the transparent electrode, and the etching pattern is removed. In this way, the first transparent electrode patterns 3 or the like can be formed.

Even when the photosensitive film is used as an etching resist (etching pattern), resist patterns can be obtained by the same method as described above. In the etching processing, etching and resist peeling can be performed by known methods described in paragraphs 0048 to 0054 of JP2010-152155A and the like.

Examples of the etching method include a generally used wet etching method in which the film is dipped into an etchant. The etchant used for wet etching may be appropriately selected from among acidic etchants and alkaline etchants in accordance with the subject to be etched. Examples of the acidic etchants include an aqueous solution containing only an acidic component such as hydrochloric acid, sulfuric acid, hydrofluoric acid, and phosphoric acid, a mixed solution consisting of an acidic component and ferric chloride, ammonium fluoride, or a salt such as potassium permanganate, and the like. As the acidic component, a combination of a plurality of acidic components may be used. Examples of the alkaline etchants include an aqueous solution containing only an alkaline component such as sodium hydroxide, potassium hydroxide, ammonia, organic amine, or a salt of organic amine like tetramethyl ammonium hydroxide, an aqueous mixed solution consisting of an alkaline component and a salt such as potassium permanganate, and the like. As the alkaline component, a combination of a plurality of alkaline components may be used.

The temperature of the etchant is not particularly limited but is preferably equal to or less than 45° C. If the resin pattern used as an etching mask (etching pattern) in the present invention is formed by using the aforementioned photocurable resin layer, the resin pattern exhibits particularly excellent resistance to the acidic and alkaline etchants in the aforementioned temperature range. Accordingly, the resin pattern is prevented from being peeled in the process of etching, and the portion free of the resin pattern is selectively etched.

After the etching, if necessary, in order to prevent line contamination, a washing step and a drying step may be performed. In the washing step, for example, the substrate may be washed with pure water at room temperature for 10 seconds to 300 seconds, and in the drying step, the substrate may be dried by using an air blower by appropriately adjusting the air blow pressure (about 0.1 kg/cm$^2$ to 5 kg/cm$^2$).

The peeling method of the resin pattern is not particularly limited. Examples of the method include a method of dipping the substrate in a peeling solution stirred at 30° C. to 80° C., preferably at 50° C. to 80° C., for 5 minutes to 30 minutes. As described above, the resin pattern used as the etching mask in the present invention exhibits excellent chemical resistance at a temperature equal to or less than 45° C. However, the resin pattern has properties in which it swells by the alkaline peeling solution when the temperature of the chemical becomes 50° C. or higher. Due to such properties, the resin pattern has an advantage that the time taken for the peeling step is shortened if the peeling solution of 50° C. to 80° C. is used for the peeling step, and the resin pattern is peeled leaving a small amount of peeling residues. That is, if the temperature of the chemical is varied in the etching step and the peeling step, the resin pattern used as the etching mask in the present invention exhibits excellent chemical resistance in the etching step and excellent peelability in the peeling step. Consequentially, both the chemical resistance and peelability, which are conflicting properties, can be satisfied at the same time.

Examples of the peeling solution include those obtained by dissolving an inorganic alkaline component such as sodium hydroxide or potassium hydroxide or an organic alkaline component such as a tertiary amine or a quaternary ammonium salt in water, dimethyl sulfoxide, N-methylpyrrolidone, or a mixed solution of these. The resin pattern may be peeled by means of a spray method, a shower method, a paddle method, or the like by using the peeling solution.

—Photosensitive Film Having Conductive Photocurable Resin Layer—

When the first transparent electrode patterns 3, the second transparent electrode patterns 4, and the conductive element 6 different from these patterns are formed by using the photosensitive film having the conductive photocurable resin layer, they can be formed by transferring the conductive photocurable resin layer onto the surface of the front panel 1.

If the first transparent electrode patterns 3 and the like are formed by using the photosensitive film having the conductive photocurable resin layer, it is possible to produce a touch panel that can be made into a thin and light layer by a simple step, without causing the resist component to leak from an opening portion even when the substrate (front panel) has the opening portion and without contaminating the back side of the substrate.

Furthermore, if the photosensitive film, which has a specific layer constitution in which the thermoplastic resin layer is disposed between the conductive photocurable resin layer and the temporary support, is used for forming the first transparent electrode patterns 3 and the like, it is possible to prevent air bubbles from being generated at the time of laminating the photosensitive film and to form the first transparent electrode patterns 3, the second transparent electrode patterns 4, and the conductive element 6 different from these patterns that have excellent conductivity and exhibit low resistance.

—Use of Photosensitive Film as Lift-Off Material—

The first transparent electrode layer, the second transparent electrode layer, and the conductive member different from these layers can also be formed by using the photosensitive film as a lift-off material. In this case, after patterning is performed by using the photosensitive film, transparent conductive layers are formed on the whole surface of the substrate, and then the photocurable resin layer is dissolved and removed for each of the deposited transparent conductive layers. In this way, intended patterns of the transparent conductive layers can be obtained (a lift-off method).

[Image Display Device]

The image display device of the present invention includes the capacitive input device of the present invention.

To the capacitive input device of the present invention and the image display device including the capacitive input device as a constituent, the constitution disclosed in "The Latest Touch Panel Technologies" (published on Jul. 6, 2009, Techno-Times Co., Ltd.), "Technologies and Development of Touch Panel" (supervised by Yuji Mitani, CMC Publishing CO., LTD., 2004, 12), T-11 lecture textbook of FPD International 2009 Forum, Cypress Semiconductor Corporation Application Note AN2292, and the like can be applied.

EXAMPLES

Hereinafter, the present invention will be more specifically described based on examples. The materials, the amount and proportion thereof used, the content of processing, the procedure of processing, and the like can be appropriately changed within a range that does not depart from the gist of the present invention. Accordingly, the scope of the present invention is not limited to the following specific examples. Herein, unless otherwise specified, "%" and "part(s)" are based on mass.

Examples 1 to 13 and Comparative Examples 1 and 2

[Preparation of Transfer Film]

<Formation of Thermoplastic Resin Layer and Intermediate Layer>

A polyethylene terephthalate film (temporary support) having a thickness of 75 μm was coated with a coating solution for a thermoplastic resin layer prepared based on the following formula H1 by using a slit nozzle, and the resultant was dried, thereby forming a thermoplastic resin layer. Subsequently, the thermoplastic resin layer was coated with a coating solution for an intermediate layer prepared based on the following formula P1, and the resultant was dried, thereby forming an intermediate layer.

(Coating Solution for Thermoplastic Resin Layer: Formula H1)

| | |
|---|---|
| Methanol | 11.1 parts by mass |
| Propylene glycol monomethyl ether acetate | 6.36 parts by mass |
| Methyl ethyl ketone | 52.4 parts by mass |
| Methyl methacrylate/2-ethylhexylacrylate/benzyl methacrylate/methacrylic acid copolymer (compositional ratio of copolymer (molar ratio) = 55/11.7/4.5/28.8, weight average molecular weight = 100,000, Tg (glass transition temperature) ≈ 70° C.) | 5.83 part by mass |
| Styrene/acrylic acid copolymer (compositional ratio of copolymer (molar ratio) = 63/37, weight average molecular weight = 10,000, Tg ≈ 100° C.) | 13.6 parts by mass |
| Monomer 1 (trade name: BPE-500, manufactured by SHIN-NAKAMURA CHEMICAL CO., LTD.) | 9.1 parts by mass |
| Fluorine-based polymer | 0.54 parts by mass |

The fluorine-based polymer is a copolymer consisting of 40 parts of $C_6F_{13}CH_2CH_2OCOCH=CH_2$, 55 parts of $H(OCH(CH_3)CH_2)_7OCOCH=CH_2$, and 5 parts of $H(OCH_2CH_2)_7OCOCH=CH_2$, and has a weight average molecular weight of 30,000. The polymer is in the form of a 30% by mass methyl ethyl ketone solution (trade name: Megaface F780F, manufactured by DIC Corporation).

(Coating Solution for Intermediate Layer: Formula P1)

| | |
|---|---|
| Polyvinyl alcohol (trade name: PVA205 manufactured by KURARAY CO., LTD., saponification degree = 88%, polymerization degree of 550) | 32.2 parts by mass |
| Polyvinylpyrrolidone (trade name: K-30, manufactured by ISP Japan Co., Ltd.) | 14.9 parts by mass |
| Distilled water | 524 parts by mass |
| Methanol | 429 parts by mass |

<First Curable Transparent Resin Layer>

The intermediate layer was coated with a material-1, a material-2, and a material-11 for the first curable transparent resin layer that were prepared according to the composition shown in the following Table 1 by varying and adjusting the amount of the coating materials such that the intended thicknesses shown in the following Table 2 were obtained. Thereafter, the resultant was dried, thereby forming the first curable transparent resin layer on the intermediate layer.

In the following Table 1 and the following Formula (1), all of "%" and "wt %" represent "% by mass".

TABLE 1

| Material | Material-1 | Material-2 | Material-11 | Material-3 | Material-4 | Material-5 | Material-6 | Material-7 | Material-8 | Material-9 | Material-10 |
|---|---|---|---|---|---|---|---|---|---|---|---|
| $ZrO_2$: ZR-010 manufactured by SOLAR CO., LTD. | 0 | 0 | 0 | 2.08 | 2.82 | 3.27 | 4.24 | 4.46 | 4.91 | 5.35 | 1.86 |
| DPHA solution (dipentaerythritol hexaacrylate: 38%, dipentaerythritol pentaacrylate: 38%, 1-methoxy-2-propyl acetate: 24%) | 0.76 | 0.76 | 0.76 | 0.29 | 0.25 | 0.22 | 0.17 | 0.16 | 0.14 | 0.11 | 0.3 |
| Urethane-based monomer: UK Oligo UA-32P manufactured by SHIN-NAKAMURA CHEMICAL CO., LTD.: nonvolatile content 75%, 1-methoxy-2-propyl acetate: 25% | 0.36 | 0.36 | 0.36 | 0.14 | 0.12 | 0.11 | 0.08 | 0.08 | 0.06 | 0.05 | 0.14 |
| Monomer mixture (polymerizable compound (b2-1) described in paragraph 0111 of JP2012-78528A), n = 1: tripentaerythritol octaacrylate content 85%, a total of 15% in the form of impurities when n = 2 and n = 3 | 0.96 | 0.96 | 0.96 | 0.36 | 0.31 | 0.28 | 0.22 | 0.2 | 0.17 | 0.14 | 0.38 |
| Polymer solution 1 (structural formula P-25 described in paragraph 0058 of JP 2008-146018A: weight average molecular weight = 35,000, solid content 45%, 1-methoxy-2-propyl acetate 15%, 1-methoxy-2-propanol 40%) | 6.69 | 6.69 | 6.69 | 1.89 | 1.63 | 1.47 | 1.13 | 1.05 | 0.89 | 0.73 | 1.97 |
| Photoradical polymerization initiator: 2-benzyl-2-dimethylamino-1-(4-morpholinophenyl)-butanone (Irgacure 379, manufactured by BASF Corporation) | 0.09 | 0.18 | 0.27 | 0.03 | 0.03 | 0.03 | 0.02 | 0.02 | 0.02 | 0.01 | 0.03 |
| Photopolymerization initiator: Kayacure DETX-S (alkylthioxanthone manufactured by Nippon Kayaku Co., Ltd.) | 0.09 | 0.18 | 0.27 | 0.03 | 0.03 | 0.03 | 0.02 | 0.02 | 0.02 | 0.01 | 0.03 |
| Polymer solution 2 (the following structural formula: weight average molecular weight 15,000, nonvolatile content 30 wt %, methyl ethyl ketone 70 wt %) | 0.03 | 0.03 | 0.03 | 0.01 | 0.01 | 0.01 | 0.01 | 0.01 | 0.01 | 0.01 | 0.01 |
| 1-Methoxy-2-propyl acetate | 52.99 | 52.81 | 52.63 | 38.73 | 38.78 | 38.81 | 38.88 | 39.9 | 38.93 | 38.96 | 38.71 |
| Methyl ethyl ketone | 38.04 | 38.04 | 38.04 | 56.8 | 56.28 | 55.96 | 55.29 | 55.13 | 54.82 | 54.51 | 56.95 |
| Total (parts by mass) | 100 | 100 | 100 | 100 | 100 | 100 | 100 | 100 | 100 | 100 | 100 |

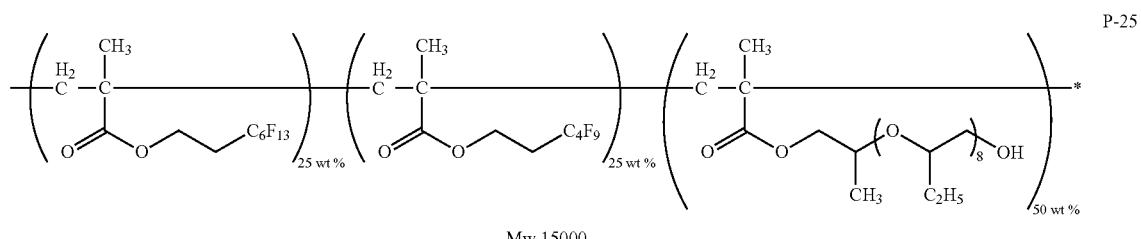

P-25

Mw 15000

-continued

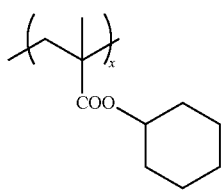 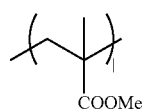 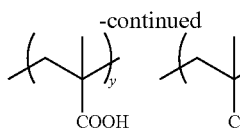 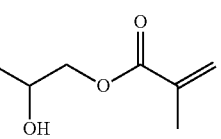

x:|:y:z = 46:2:20:32

At a point in time when the first curable transparent resin layer had been formed by coating the intermediate layer with the material for the first curable transparent resin layer and drying the resultant, the first curable transparent resin layer was cut into slices from the surface thereof by using a microtome. Thereafter, 2 mg of KBr powder was added per 0.1 mg of the slices, and the resultant was thoroughly mixed under yellow light, thereby preparing measurement samples not yet being cured with UV that were used for measurement of a double bond consumption rate that will be described later.

In Examples 1 to 12 and Comparative examples 1 and 2, the first curable transparent resin layer was formed and then irradiated with a UV lamp (an exposure amount of 300 mJ/cm$^2$, a metal halide lamp). Here, in Example 13, the first curable transparent resin layer was not irradiated with the UV lamp.

At a point in time when the first curable transparent resin layer had been formed and then cured, the first curable transparent resin layer was cut into slices from the surface thereof by using a microtome. Thereafter, 2 mg of KBr powder was added per 0.1 mg of the slices, and the resultant was thoroughly mixed under yellow light, thereby preparing measurement samples (film slices) having undergone coating, drying, and curing that were used for measurement of a double bond consumption rate that will be described later.

(Measurement of Double Bond Consumption Rate)

By using an FT-IR device (manufactured by Thermo Fisher Scientific Japan K.K., Nicolet 710), a wavelength region of 400 cm$^{-1}$ to 4,000 cm$^{-1}$ was measured, and peak intensity at 810 cm$^{-1}$ resulting from a C—C bond was determined. In this way, a peak intensity (equal to the amount of residual double bonds) A of samples which underwent only the coating and drying and had not yet been cured with UV, and a peak intensity B of each of the film slices having undergone coating, drying, and curing were determined. For each of the first curable transparent resin layers formed in each of the examples and comparative examples, a double bond consumption rate was calculated according to the following equation.

Double bond consumption rate=$\{1-(B/A)\}\times 100\%$      Equation

<<Evaluation Criteria>>

G: The double bond consumption rate is equal to or higher than 10%.

NG: The double bond consumption rate is lower than 10%.

The double bond consumption rate is an index showing a degree of interfacial mixing that occurs between the first layer and the second layer.

<Formation of Second Curable Transparent Resin Layer>

Subsequently, the first curable transparent resin layer was coated with a material-3 to a material-10 for a second curable transparent resin layer that were prepared according to the composition shown in Table 1 by varying and adjusting the amount of the coating materials such that the intended thicknesses shown in the following Table 2 were obtained. Thereafter, the resultant was dried, thereby forming the second curable transparent resin layer on the first curable transparent resin layer. Herein, ZrO$_2$ used in the material-3 to the material-10 is in the form of particles having a refractive index of 2.2 and an average particle size of about 20 nm.

<Compression of Protective Film>

In this way, on the temporary support, the thermoplastic resin layer having a dry film thickness of 15.1 μm, the intermediate layer having a dry film thickness of 1.6 μm, and the first curable transparent resin layer and the second curable transparent resin layer having a dry film thickness shown in the following Table 2 were disposed, and finally, a protective film (a polypropylene film having a thickness of 12 μm) was compressed onto the resultant.

In this way, a transfer film was prepared in which the temporary support, the thermoplastic resin layer, the intermediate layer (oxygen barrier film), the first curable transparent resin layer, and the second curable transparent resin layer, and the protective film were integrated with each other. The obtained transfer film was used as a transfer film of each of the examples and comparative examples.

[Preparation of Transparent Laminate]

By using the transfer film of each of the examples and comparative examples obtained as above, a transparent laminate was prepared by the following method.

<1. Formation of Transparent Film>

On a transparent substrate made of glass (glass substrate) having a refractive index of 1.51, a transparent film having a refractive index of 1.60 and a thickness of 80 nm was formed by the following method by using the material-3 shown in Table 1.

(Preparation of Transfer Material)

By using a slit nozzle, a polyethylene terephthalate film (temporary support) having a thickness of 75 μm was coated with the coating solution for a thermoplastic resin layer prepared according to the formula H1, and the resultant was dried, thereby forming a thermoplastic resin layer. Thereafter, the thermoplastic resin layer was coated with the coating solution for an intermediate layer prepared according to the formula P1, and the resultant was dried, thereby forming an intermediate layer. Furthermore, the intermediate layer was coated with the material-3 for a transparent curable composition prepared according to the composition described in Table 1, and the resultant was dried, thereby forming a transparent resin layer. In this way, on the temporary support, the thermoplastic resin layer having a dry film thickness of 15.1 μm, the intermediate layer having a dry film thickness of 1.6 μm, and the transparent resin layer having a dry film thickness of 80 nm were disposed. Finally, a protective film (a polypropylene film having a thickness of 12 μm) was compressed on the transparent resin layer. In this way, a transfer film was prepared in which the temporary support, the thermoplastic resin layer, the intermediate layer (an oxygen barrier film), the transparent resin layer, and the protective film were integrated with each other.

(Formation of Transparent Film)

By using the transfer film from which the protective film was peeled, the transparent resin layer, the thermoplastic resin layer, the intermediate layer, and the PET temporary support were simultaneously transferred onto the transparent substrate made of glass. Thereafter, the PET temporary support was peeled.

Thereafter, the whole surface of the transparent substrate was exposed to an i-ray at 40 mJ/cm$^2$ from the side of the thermoplastic resin layer by using a proximity-type exposure machine (manufactured by Hitachi High-Tech Electronics Engineering Co., Ltd.) having a super-high pressure mercury lamp. Then, the transparent substrate was developed with a triethanolamine-based developer (containing 30% by mass of triethanolamine, obtained by diluting T-PD2 (trade name, manufactured by FUJIFILM Corporation) with pure water by 10-fold (mixing T-PD2 with pure water at a ratio of 1 part:9 part)) for 60 seconds by means of shower at 30° C. and a flat nozzle pressure of 0.04 MPa, thereby removing the thermoplastic resin layer and the intermediate layer. Subsequently, air was blown to the upper surface (the side of the transparent resin layer) of the transparent substrate made of glass so as to drain off liquid. Thereafter, the transparent substrate was washed with pure water that was sprayed thereto for 10 seconds by shower, and air was blown thereto so as to reduce liquid pool on the transparent substrate made of glass. The transparent substrate made of glass was then subjected to heating processing (post-baking) for 60 minutes at 230° C., thereby obtaining a transparent substrate made of glass on which a transparent film had been laminated.

<2. Formation of Transparent Electrode Pattern>

The transparent substrate made of glass, on which the transparent film had been laminated as above, was put into a vacuum chamber, and by using an ITO target (indium:tin=95:5 (molar ratio)) with an SnO$_2$ content of 10% by mass, an ITO thin film having a thickness of 40 nm and a refractive index of 1.82 was formed by DC magnetron sputtering (conditions: substrate temperature of 250° C., argon pressure of 0.13 Pa, oxygen pressure of 0.01 Pa), thereby obtaining a front panel in which a transparent electrode layer was formed. The surface resistance of the ITO thin film was 80 Ω/square.

(Preparation of Photosensitive Film E1 for Etching)

A polyethylene terephthalate film (temporary support) having a thickness of 75 μm was coated with the coating solution for a thermoplastic resin layer prepared according to the formula H1 by using a slit nozzle, and the resultant was dried, thereby forming a thermoplastic resin layer. Thereafter, the thermoplastic resin layer was coated with the coating solution for an intermediate layer prepared according to the formula P1, and the resultant was dried, thereby forming an intermediate layer. Furthermore, the intermediate layer was coated with a coating solution for a photocurable resin layer for etching prepared according to the following formula E1, and the resultant was dried, thereby forming a photocurable resin layer for etching. In this way, on the temporary support, a laminate was formed which was composed of the thermoplastic resin layer having a dry film thickness of 15.1 μm, the intermediate layer having a dry film thickness of 1.6 μm, and the photocurable resin layer for etching having a thickness of 2.0 μm. Finally, a protective film (a polypropylene film having a thickness of 12 μm) was compressed onto the photocurable resin layer for etching. In this way, a transfer material was prepared in which the temporary support, the thermoplastic resin layer, the intermediate layer (an oxygen barrier film), and the photocurable resin layer for etching were integrated with each other.

(Coating Solution for Photocurable Resin Layer for Etching: Formula E1)

| | |
|---|---|
| Methyl methacrylate/styrene/methacrylic acid copolymer (compositon of copolymer (% by mass): 31/40/29, weight average molecular weight: 60,000, acid value: 163 mg KOH/g) | 16 parts by mass |
| Monomer 1 (trade name: BPE-500, manufacturedby SHIN-NAKAMURA CHEMICAL CO., LTD.) | 5.6 parts by mass |
| Tetraethylene oxide monomethacrylate 0.5-mol adduct of hexamethylene diisocyanate | 7 parts by mass |
| Cyclohexane dimethanol monoacrylate as a compound having one polymerizable group in a molecule | 2.8 part by mass |
| 2-Chloro-N-butylacrydone | 0.42 parts by mass |
| 2,2-Bis(o-chlorophenyl)-4,4',5,5'-tetraphenyl biimidazole | 2.17 parts by mass |
| Malachite green oxalate | 0.02 parts by mass |
| Leuco crystal violet | 0.26 parts by mass |
| Phenothiazine | 0.013 parts by mass |
| Surfactant (trade name: Megaface F-780F, manufactured by DIC Corporation) | 0.03 parts by mass |
| Methyl ethyl ketone | 40 parts by mass |
| 1-Methoxy-2-propanol | 20 parts by mass |

Herein, after a solvent was removed from the coating solution for a photocurable resin layer for etching prepared according to the formula E1, the viscosity of the coating solution was 2,500 Pa·sec at 100° C.

(Formation of Transparent Electrode Pattern)

The front panel in which the transparent electrode layer had been formed was washed, and then the photosensitive film E1 for etching from which the protective film had been removed was laminated on the front panel (substrate temperature: 130° C., rubber roller temperature: 120° C., linear pressure: 100 N/cm, transport rate: 2.2 m/min). After the temporary support was peeled, the distance between the surface of an exposure mask (a quartz exposure mask having transparent electrode patterns) and the photocurable resin layer for etching was set to 200 μm, and the laminate was patternwise exposed at an exposure amount of 50 mJ/cm$^2$ (i-ray).

Thereafter, the resultant was subjected to development processing for 100 seconds at 25° C. by using a triethanolamine-based developer (containing 30% by mass of triethanolamine, obtained by diluting T-PD2 (trade name, manufactured by FUJIFILM Corporation) with pure water by 10-fold), and then subjected to washing processing for 20 seconds at 33° C. by using a surfactant-containing washing solution (a solution obtained by diluting T-SD3 (trade name, manufactured by FUJIFILM Corporation) with pure water by 10-fold). The front panel having undergone the washing processing was rubbed with a rotary brush, and ultrapure water was sprayed to the front panel from an ultra-high pressure washing nozzle, thereby removing residues. Subsequently, the resultant was subjected to post-baking processing for 30 minutes at 130° C., thereby obtaining a front panel in which the transparent electrode layer and the pattern of the photocurable resin layer for etching were formed.

The front panel, in which the transparent electrode layer and the pattern of the photocurable resin layer for etching were formed, was treated (subjected to etching processing) for 100 seconds by being dipped into an etching tank containing an ITO etchant (an aqueous solution containing hydrochloric acid and potassium chloride, solution temperature: 30° C.) so as to dissolve and remove the transparent electrode layer in an exposed area that was not covered with the photocurable resin layer for etching. As a result, a front panel with a pattern of a transparent electrode layer was obtained which had the pattern of the photocurable resin layer for etching.

Subsequently, the front panel with a pattern of a transparent electrode layer that had the pattern of the photocurable resin layer for etching was treated (subjected to peeling processing) for 200 seconds by being dipped into a resist-peeling tank containing a resist-peeling solution (N-methyl-2-pyrrolidone, monoethanolamine, a surfactant (trade name: Surfynol 465, manufactured by Air Products and Chemicals, Inc), solution temperature: 45° C.), thereby removing the photocurable resin layer for etching. As a result, a substrate was obtained in which the transparent film and the transparent electrode pattern were formed on the transparent substrate made of glass.

A Pt coat (having a thickness of about 20 nm) was formed at the end of the transparent electrode pattern, so as to give conductivity and to protect the surface. Then, by using a multi-function machine of Nova 200-type FIB/SEM manufactured by FEI, the shape of the end of the transparent electrode pattern was observed (a secondary electron image, acceleration voltage of 20 kV).

The formed ITO pattern had a tapered shape as shown in FIG. 10, and a taper angle α thereof was about 3°.

<3. Formation of First Curable Transparent Resin Layer and Second Curable Transparent Resin Layer>

On the substrate obtained as above in which the transparent film and the transparent electrode pattern had been formed on the transparent substrate made of glass, by using the transfer film of each of the examples and comparative examples, a transparent laminate in which the transparent electrode pattern, the second curable transparent resin layer, and the first curable transparent resin layer continued in this order was formed by the same method as used for forming the transparent film on the transparent substrate made of glass.

In this way, a transparent laminate was obtained in which the transparent film, the transparent electrode pattern, the second curable transparent resin layer, and the first curable transparent resin layer were laminated on the transparent substrate made of glass in this order. The obtained transparent laminate was used as the transparent laminate of each of the examples and comparative examples.

[Evaluation of Transparent Laminate]

<Evaluation of Visibility of Transparent Electrode Pattern>

The transparent laminate of each of the examples and comparative examples, in which the transparent film, the transparent electrode pattern, the second curable transparent resin layer, and the first curable transparent resin layer were laminated on the transparent substrate made of glass in this order, was stuck to a black PET material through a transparent adhesive tape (manufactured by 3M, trade name: OCA Tape 8171CL), and the entirety of the substrate was shielded from light.

In a darkroom, light from a fluorescent lamp (light source) was caused to enter the prepared substrate through the side of the glass surface, the light reflected from the glass surface was visually observed in an oblique direction, and in this way, the visibility of the transparent electrode pattern was evaluated.

<<Evaluation Criteria>>

A: The transparent electrode pattern is not seen at all.

B: The transparent electrode pattern is barely seen or slightly seen.

C: The transparent electrode pattern is seen (however, the transparent electrode pattern is not easily noticed).

D: Although the transparent electrode pattern is seen, it is acceptable for practical use.

E: The transparent electrode pattern is clearly seen (the transparent electrode pattern is easily noticed).

The obtained results are described in the following Table 2.

<Evaluation of Pencil Hardness>

As an index of scratch resistance, evaluation of pencil hardness described in JIS K 5400 was performed. The transparent laminate of each of the examples and comparative examples, which was obtained by transferring the transfer film of each of the examples and comparative examples to the substrate having the transparent substrate made of glass, the transparent film, and the transparent electrode pattern, was subjected to humidity conditioning for 1 hour at a temperature of 25° C. and a relative humidity of 60%. Thereafter, by using a 2H pencil for test specified in JIS S 6006, the pencil hardness was evaluated under a load of 500 g and a condition of n=7.

<<Evaluation Criteria>>

A: The number of scratches is less than 3.

B: The number of scratches is equal to or greater than 3 and less than 5.

C: The number of scratches is equal to or greater than 5 and less than 6.

D: The number of scratches is equal to or greater than 6.

The obtained results are described in the following Table 2.

TABLE 2

| | Constitution of transparent laminate | | | | | | | Evaluation of transparent laminate | |
|---|---|---|---|---|---|---|---|---|---|
| | First curable transparent resin layer | | | | Second curable transparent resin layer | | | Visibility of | |
| | Type | Refractive index | Thickness (nm) | Double bond consumption rate | Type | Refractive index | Thickness (nm) | transparent electrode pattern | Pencil hardness |
| Example 1 | Material-1 | 1.51 | 2000 | G | Material-3 | 1.6 | 80 | C | A |
| Example 2 | Material-1 | 1.51 | 2500 | G | Material-4 | 1.63 | 90 | C | A |
| Example 3 | Material-2 | 1.52 | 1500 | G | Material-5 | 1.65 | 100 | B | A |
| Example 4 | Material-1 | 1.51 | 3000 | G | Material-6 | 1.69 | 70 | B | A |
| Example 5 | Material-2 | 1.52 | 2000 | G | Material-7 | 1.7 | 65 | A | A |
| Example 6 | Material-1 | 1.51 | 1800 | G | Material-8 | 1.72 | 52 | A | A |
| Example 7 | Material-1 | 1.51 | 2500 | G | Material-9 | 1.74 | 100 | A | A |

TABLE 2-continued

| | Constitution of transparent laminate | | | | | | | Evaluation of transparent laminate | |
|---|---|---|---|---|---|---|---|---|---|
| | First curable transparent resin layer | | | | Second curable transparent resin layer | | | Visibility of transparent | |
| | Type | Refractive index | Thickness (nm) | Double bond consumption rate | Type | Refractive index | Thickness (nm) | electrode pattern | Pencil hardness |
| Example 8 | Material-11 | 1.53 | 2000 | G | Material-8 | 1.72 | 150 | B | A |
| Example 9 | Material-1 | 1.51 | 2200 | G | Material-8 | 1.72 | 500 | B | A |
| Example 10 | Material-1 | 1.51 | 1000 | G | Material-7 | 1.7 | 90 | A | B |
| Example 11 | Material-1 | 1.51 | 900 | G | Material-7 | 1.7 | 93 | A | C |
| Comparative example 1 | Material-1 | 1.51 | 2000 | G | Material-10 | 1.59 | 83 | E | A |
| Example 12 | Material-1 | 1.51 | 2200 | G | Material-7 | 1.7 | 550 | D | B |
| Comparative example 2 | Material-1 | 1.51 | 2000 | G | — | — | — | E | A |
| Example 13 | Material-2 | 1.52 | 1800 | NG | Material-8 | 1.72 | 52 | D | A |

From Table 2, it was understood that the transparent laminate of the present invention prepared by using the transfer film of the present invention does not have a problem in that the transparent electrode pattern is visually recognized.

In contrast, in Comparative example 1 using the transfer film in which the refractive index of the second curable transparent resin layer was 1.59 that was lower than the range of the present invention, the transparent electrode pattern of the obtained transparent laminate was clearly seen. In Comparative example 2 using the transfer film not having the second curable transparent resin layer, the transparent electrode pattern of the obtained transparent laminate was clearly seen.

Examples 101 to 113 and Comparative Examples 101 and 102

Production of Capacitive Input Device

<<Formation of Mask Layer>>
[Preparation of Photosensitive Film K1 for Forming Mask Layer]

A polyethylene terephthalate film (temporary support) having a thickness of 75 μm was coated with the coating solution for a thermoplastic resin layer prepared according to the formula H1 by using a slit nozzle, and the resultant was dried, thereby forming a thermoplastic resin layer. Thereafter, the thermoplastic resin layer was coated with the coating solution for an intermediate layer prepared according to the formula P1, and the resultant was dried, thereby forming an intermediate layer. Furthermore, the intermediate layer was coated with a coating solution for a black photocurable resin layer prepared according to the following formula K1, and the resultant was dried, thereby forming a black photocurable resin layer. In this way, on the temporary support, the thermoplastic resin layer having a dry film thickness of 15.1 μm, the intermediate layer having a dry film thickness of 1.6 μm, and the black photocurable resin layer having a dry film thickness of 2.2 μm to yield optical density of 4.0 were disposed. Finally, a protective film (a polypropylene film having a thickness of 12 μm) was compressed onto the resultant. In this way, a transfer material was prepared in which the temporary support, the thermoplastic resin layer, the intermediate layer (an oxygen barrier film), and the black photocurable resin layer were integrated with each other, and this sample was named photosensitive film K1 for a mask layer.

(Coating Solution for Black Photocurable Resin Layer: Formula K1)

| | |
|---|---|
| K pigment dispersion 1 | 31.2 part by mass |
| R pigment dispersion 1 (having the following composition) | 3.3 parts by mass |
| MMPGAc (propylene glycol monomethyl ether acetate, manufactured by manufactured by Daicel Corporation) | 6.2 parts by mass |
| Methyl ethyl ketone (manufactured by Tonen Chemical Corporation) | 34.0 parts by mass |
| Cyclohexanone (manufactured by Kanto Denka Kogyo Co., Ltd.) | 8.5 parts by mass |
| Binder 2 (random compolymer consisting of benzyl methacrylate and methacrylic acid at a molar ratio of 78/22, weight average molecular weight of 38,000) | 10.8 parts by mass |
| Phenothiazine (manufactured by Tokyo Chemical Industry Co., Ltd.) | 0.01 parts by mass |
| Propylene glycol monomethyl ether acetate solution (76% by mass) of DPHA (dipentaerythritol hexaacrylate, manufactured by Nippon Kayaku Co., Ltd.) | 5.5 parts by mass |
| 2,4-Bis(trichloromethyl)-6-[4'-(N,N-bis(ethoxycarbonyl-methyl) amino-3'-bromophenyl)-s-triazine | 0.4 parts by mass |
| Surfactant (trade name: Megaface F-780F, manufactured by DIC Corporation) | 0.1% by mass |

Herein, after a solvent was removed from the coating solution for a black photocurable resin layer prepared according to the formula K1, the viscosity of the coating solution was 10,000 Pa·sec at 100° C.

(Composition of K Pigment Dispersion 1)

| | |
|---|---|
| Carbon black (trade name: Nipex35, manufactured by Evonik Degussa Co., Ltd.): | 13.1% by mass |
| Following dispersant 1: | 0.65% by mass |
| Binder 1 (random copolymer consisting of benzyl methacrylate and methacrylic acid at a molar ratio of 72/28, weight average molecular weight of 37,000): | 6.72% by mass |

-continued

| | |
|---|---|
| Propylene glycol monomethyl ether acetate: | 79.53% by mass |

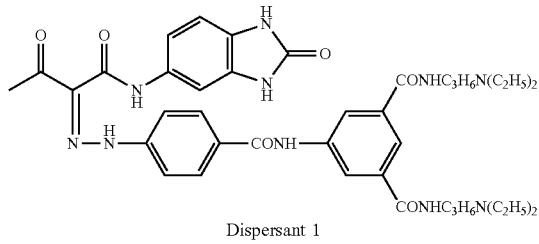

Dispersant 1

—Composition of R Pigment Dispersion 1—

| | |
|---|---|
| Pigment (C. I. Pigment Red 177) | 18% by mass |
| Binder 1 (random copolymer consisting of benzyl methacrylate and methacrylic acid at a molar ratio of 72/28, weight average molecular weight of 37,000) | 12% by mass |
| Propylene glycol monomethyl ether acetate | 70% by mass |

[Formation of Mask Layer]

Thereafter, a piece of reinforced glass (300 mm×400 mm×0.7 mm), in which an opening portion (15 mmφ) had been formed, was washed with a rotary brush having nylon bristles in a state where a liquid glass washer adjusted to be at 25° C. was being sprayed to the glass for 20 seconds by shower, and then the glass was washed with pure water by shower. Thereafter, a silane coupling solution (an aqueous 0.3% by mass N-β(aminoethyl)γ-aminopropyltrimethoxyxilane solution, trade name: KBM603, manufactured by Shin-Etsu Chemical Co., Ltd.) was sprayed to the substrate for 20 seconds by shower, and then the substrate was washed with pure water by shower. The substrate was heated for 2 minutes at 140° C. by using a substrate-preheating device. From the photosensitive film K1 for forming a mask layer obtained as above, the protective film was removed, and then the photosensitive film K1 was superimposed on the obtained glass substrate which had undergone the silane coupling processing, such that the surface of the black photocurable resin layer exposed after the removal of the protective film came into contact with the surface of the glass substrate having undergone the silane coupling processing. Subsequently, by using a laminator (manufactured by Hitachi Industrial Equipment Systems Co., Ltd. (Lamic II model)), the photosensitive film K1 was laminated on the substrate which had been heated to 140° C., at a rubber roller temperature of 130° C., a linear pressure of 100 N/cm, and a transport rate of 2.2 m/min. Then, the temporary support of polyethylene terephthalate was removed by being peeled from the interface between the temporary support and the thermoplastic resin layer. After the temporary support was peeled, in a state where the substrate and an exposure mask (a quartz exposure mask having a frame pattern) were caused to stand vertically, a distance between the surface of the exposure mask and the black photocurable resin layer was set to be 200 μm, and the sample was patternwise exposed (i-ray) at an exposure amount of 70 mJ/cm² by using a proximity-type exposure machine (manufactured by Hitachi High-Tech Electronics Engineering Co., Ltd.) having a super-high pressure mercury lamp.

Subsequently, the resultant was developed by being showered with a triethanolamine-based developer (containing 30% by mass of triethanolamine, obtained by diluting T-PD2 (trade name, manufactured by FUJIFILM Corporation) with pure water by 10-fold) for 60 seconds at 33° C. and a flat nozzle pressure of 0.1 MPa, thereby removing the thermoplastic resin layer and the intermediate layer. Then, air was blown to the top surface of the glass substrate so as to drain off liquid, and pure water was sprayed for 10 seconds thereto so as to wash the substrate. Thereafter, air was blown to the glass substrate so as to reduce liquid pool on the substrate.

Thereafter, the resultant was developed for 45 seconds at 32° C. by using a sodium carbonate/sodium hydrogen carbonate-based developer (solution obtained by diluting T-CD1 (trade name, manufactured by FUJIFILM Corporation) with pure water by 5-fold) and by setting a shower pressure to be 0.1 MPa, and then washed with pure water.

Then, a surfactant-containing washer (a solution obtained by diluting T-SD3 (trade name, manufactured by FUJIFILM Corporation) with pure water by 10-fold) was sprayed to the resultant by shower for 20 seconds at 33° C. by setting a conical nozzle pressure to be 0.1 MPa. Furthermore, the formed pattern image was rubbed with a rotary brush having soft nylon bristles so as to remove residues. Moreover, ultrapure water was sprayed thereto by an ultra-high pressure washing nozzle at a pressure of 9.8 MPa, thereby removing residues.

Subsequently, the resultant was subjected to post-exposure at an exposure amount of 1,300 mJ/cm² in the atmosphere and then subjected to post-baking processing for 80 minutes at 240° C., thereby obtaining a front panel in which a mask layer having optical density of 4.0 and a thickness of 2.0 μm was formed.

<<Transparent Film>>

A transparent film was formed on the front panel in which the mask layer had been formed, in the same method as used for forming the transparent film on the transparent substrate made of glass in forming the transparent laminates of Examples 1 to 13 and Comparative examples 1 and 2.

<<Formation of First Transparent Electrode Patterns>>

[Formation of Transparent Electrode Layer]

The front panel, in which the mask layer and the transparent film had been formed, was put into a vacuum chamber, and by using an ITO target (indium:tin=95:5 (molar ratio)) with an $SnO_2$ content of 10% by mass, an ITO thin film having a thickness of 40 nm was formed by DC magnetron sputtering (conditions: substrate temperature of 250° C., argon pressure of 0.13 Pa, oxygen pressure of 0.01 Pa), thereby obtaining a front panel in which a transparent electrode layer was formed. The surface resistance of the ITO thin film was 80 Ω/square.

[Preparation of Photosensitive Film E1 for Etching]

The photosensitive film E1 for etching was obtained in the same manner as in Preparation of photosensitive film K1 for forming mask layer, except that in Preparation of photosensitive film K1 for forming mask layer, the coating solution for a black photocurable resin layer was replaced with a coating solution for a photocurable resin layer for etching prepared according to the following formula E1 (the thickness of the photocurable resin layer for etching was 2.0 μm).

(Coating Solution for Photocurable Resin Layer for Etching: Formula E1)

| | |
|---|---|
| Methyl methacrylate/styrene/methacrylic acid copolymer (compositon of copolymer (% by mass): 31/40/29, mass average molecular weight: 60,000, acid value: 163 mg KOH/g) | 16 parts by mass |

| | |
|---|---|
| Monomer 1 (trade name: BPE-500, manufactured by SHIN-NAKAMURA CHEMICAL CO., LTD.) | 5.6 parts by mass |
| Tetraethylene oxide monomethacrylate 0.5-mol adduct of hexamethylene diisocyanate | 7 parts by mass |
| Cyclohexane dimethanol monoacrylate as a compound having one polymerizable group in a molecule | 2.8 part by mass |
| 2-Chloro-N-butylacrydone | 0.42 parts by mass |
| 2,2-Bis(o-chlorophenyl)-4,4',5,5'-tetraphenyl biimidazole | 2.17 parts by mass |
| Malachite green oxalate | 0.02 parts by mass |
| Leuco crystal violet | 0.26 parts by mass |
| Phenothiazine | 0.013 parts by mass |
| Surfactant (trade name: Megaface F-780F, manufactured by DIC Corporation) | 0.03 parts by mass |
| Methyl ethyl ketone | 40 parts by mass |
| 1-Methoxy-2-propanol | 20 parts by mass |

Herein, after a solvent was removed from the coating solution for a photocurable resin layer for etching prepared according to the formula E1, the viscosity of the coating solution was 2,500 Pa·sec at 100° C.

[Formation of First Transparent Electrode Patterns]

In the same manner as in Formation of mask layer, the front panel, in which the mask layer, the transparent film, and the transparent electrode layer had been formed, was washed, and then the photosensitive film E1 for etching from which the protective film had been removed was laminated on the front panel (substrate temperature: 130° C., rubber roller temperature: 120° C., linear pressure: 100 N/cm, transport rate: 2.2 m/min). After the temporary support was peeled, the distance between the surface of an exposure mask (quartz exposure mask having transparent electrode patterns) and the photocurable resin layer for etching was set to be 200 µm, and the laminate was patternwise exposed at an exposure amount of 50 mJ/cm² (i-ray).

Thereafter, the resultant was subjected to development processing for 100 seconds at 25° C. by using a triethanolamine-based developer (containing 30% by mass of triethanolamine, obtained by diluting T-PD2 (trade name, manufactured by FUJIFILM Corporation) with pure water by 10-fold), and then subjected to washing processing for 20 seconds at 33° C. by using a surfactant-containing washing solution (a solution obtained by diluting T-SD3 (trade name, manufactured by FUJIFILM Corporation) with pure water by 10-fold). The front panel having undergone the washing processing was rubbed with a rotary brush, and ultrapure water was sprayed to the front panel from an ultra-high pressure washing nozzle, thereby removing residues. Subsequently, the resultant was subjected to post-baking processing for 30 minutes at 130° C., thereby obtaining a front panel in which the transparent electrode layer and the pattern of the photocurable resin layer for etching were formed.

The front panel, in which the transparent electrode layer and the pattern of the photocurable resin layer for etching had been formed, was treated (subjected to etching processing) for 100 seconds by being dipped into an etching tank containing an ITO etchant (an aqueous solution containing hydrochloric acid and potassium chloride, solution temperature: 30° C.) so as to dissolve and remove the transparent electrode layer in an exposed area that was not covered with the photocurable resin layer for etching. As a result, a front panel with a pattern of a transparent electrode layer was obtained which had the pattern of the photocurable resin layer for etching.

Subsequently, the front panel with a pattern of a transparent electrode layer that had the pattern of the photocurable resin layer for etching was treated for 200 seconds by being dipped into a resist-peeling tank containing a resist-peeling solution (N-methyl-2-pyrrolidone, monoethanolamine, a surfactant (trade name: Surfynol 465, manufactured by Air Products and Chemicals, Inc), solution temperature: 45° C.), thereby removing the photocurable resin layer for etching. As a result, a front panel was obtained in which the mask layer, the transparent film, and the first transparent electrode patterns were formed.

<<Formation of Insulating Layer>>

[Preparation of Photosensitive Film W1 for Forming Insulating Layer]

A photosensitive film W1 for forming an insulating layer was obtained in the same manner as in Preparation of photosensitive film K1 for forming mask layer, except that in Preparation of photosensitive film K1 for forming mask layer, the coating solution for a black photocurable resin layer was replaced with a coating solution for an insulating layer prepared according to the following formula W1 (the thickness of the insulating layer was 1.4 µm).

(Coating Solution for Insulating Layer: Formula W1)

| | |
|---|---|
| Binder 3 (1-methoxy-2-propanol of a glycidyl methacrylate adduct (d) of cyclohexyl methacrylate (a)/methyl methacrylate (b)/methacrylic acid copolymer (c) (composition (% by mass): a/b/c/d = 46/1/10/43, mass average molecular weight: 36,000, acid value: 66 mg KOH/g), methyl ethyl ketone solution (solid content: 45%)) | 12.5 parts by mass |
| Propylene glycol monomethyl ether acetate solution (76% by mass) of DPHA (dipentaerythritolhexaacrylate, manufactured by Nippon Kayaku Co., Ltd.) | 1.4 parts by mass |
| Urethane-based monomer (trade name: NKOligo UA-32P manufactured by SHIN-NAKAMURA CHEMICAL CO., LTD.: 75% of nonvolatile component, 25% of propylene glycol monomethyl ether acetate) | 0.68 parts by mass |
| Tripentaerythritol octaacrylate (trade name: V#802, manufactured by OSAKA ORGANIC CHEMICAL INDUSTRY, LTD.) | 1.8 parts by mass |
| Diethyl thioxanthone | 0.17 parts by mass |
| 2-(Dimethylamino)-2-[(4-methylphenyl)methyl]-1-[4-(4-morpholinyl)phenyl]-1-butanone (trade name: Irgacure379, manufactured by BASF Corporation) | 0.17 parts by mass |
| Dispersant (trade name, Solsperse 20000, manufactured by Avecia, Ltd.) | 0.19 parts by mass |
| Surfactant (trade name: Megaface F-780F, manufactured by DIC Corporation) | 0.05 parts by mass |
| Methyl ethyl ketone | 23.3 parts by mass |
| MMPGAc (propylene glycol monomethyl ether acetate manufactured by Daicel Corporation) | 59.8 parts by mass |

Herein, after a solvent was removed from the coating solution for forming an insulating layer prepared according to the formula W1, the viscosity of the coating solution was 4,000 Pa·sec at 100° C.

In the same manner as in Formation of mask layer, the front panel, in which the mask layer, the transparent film, and the first transparent electrode patterns had been formed, was washed and subjected to silane coupling processing, and then the photosensitive film W1 for forming an insulating layer, from which the protective film had been removed, was laminated on the front panel (substrate temperature: 100° C., rubber roller temperature: 120° C., linear pressure: 100 N/cm, transport rate: 2.3 m/min). After the temporary support was peeled, the distance between the surface of an exposure mask (quartz exposure mask having transparent electrode patterns) and the insulating layer was set to be 100

μm, and the laminate was patternwise exposed at an exposure amount of 30 mJ/cm² (i-ray).

Thereafter, the resultant was subjected to development processing for 60 seconds at 33° C. by using a triethanolamine-based developer (containing 30% by mass of triethanolamine, obtained by diluting T-PD2 (trade name, manufactured by FUJIFILM Corporation) with pure water by 10-fold), and then further subjected to development processing for 50 seconds at 25° C. by using a sodium carbonate/sodium hydrogen carbonate-based developer (solution obtained by diluting T-CD1 (trade name, manufactured by FUJIFILM Corporation) with pure water by 5-fold). Then the resultant was subjected to washing processing for 20 seconds at 33° C. by using a surfactant-containing washing solution (a solution obtained by diluting T-SD3 (trade name, manufactured by FUJIFILM Corporation) with pure water by 10-fold). The front panel having undergone the washing processing was rubbed with a rotary brush, and ultrapure water was sprayed to the front panel from an ultra-high pressure washing nozzle, thereby removing residues. Subsequently, the resultant was subjected to post-baking processing for 60 minutes at 230° C., thereby obtaining a front panel in which the mask layer, the transparent film, the first transparent electrode patterns, and the pattern of the insulating layer were formed.

<<Formation of Second Transparent Electrode Patterns>>

[Formation of Transparent Electrode Layer]

In the same manner as in Formation of first transparent electrode patterns, the front panel, in which the mask layer, the transparent film, the first transparent electrode patterns, and the pattern of the insulating layer had been formed, was subjected to DC magnetron sputtering processing (conditions: substrate temperature of 50° C., argon pressure of 0.13 Pa, oxygen pressure of 0.01 Pa) so as to form an ITO thin film having a thickness of 80 nm, thereby obtaining a front panel in which a transparent electrode layer had been formed. The surface resistance of the ITO thin film was 110 Ω/square.

In the same manner as in Formation of first transparent electrode patterns, a front panel, in which the mask layer, the transparent film, the first transparent electrode patterns, the pattern of the insulating layer, the transparent electrode layer, and the pattern of the photocurable resin layer for etching had been formed, was obtained by using the photosensitive film E1 for etching (post-baking processing was performed for 30 minutes at 130° C.).

Furthermore, in the same manner as in Formation of first transparent electrode patterns, the front panel was etched (for 50 seconds at 30° C.), and then the photocurable resin layer for etching was removed (for 200 seconds at 45° C.), thereby obtaining a front panel in which the mask layer, the transparent film, the first transparent electrode patterns, the pattern of the insulating layer, and the second transparent electrode patterns were formed.

<<Formation of Conductive Element Different from First and Second Transparent Electrode Patterns>>

In the same manner as in Formation of first and second transparent electrode patterns, the front panel, in which the mask layer, the transparent film, the first transparent electrode patterns, the pattern of the insulating layer, and the second transparent electrode patterns had been formed, was subjected to DC magnetron processing, thereby obtaining a front panel in which an aluminum (Al) thin film having a thickness of 200 nm was formed.

In the same manner as in Formation of first and second transparent electrode patterns, a front panel, in which the mask layer, the transparent film, the first transparent electrode patterns, the pattern of the insulating layer, the second transparent electrode patterns, and the pattern of the photocurable resin layer for etching were formed, was obtained by using the photosensitive film E1 for etching (the post-baking processing was performed for 30 minutes at 130° C.).

Furthermore, in the same manner as in Formation of first transparent electrode patterns, the front panel was etched (for 50 seconds at 30° C.), and then the photocurable resin layer for etching was removed (for 200 seconds at 45° C.), thereby obtaining a front panel in which the mask layer, the transparent film, the first transparent electrode patterns, the pattern of the insulating layer, the second transparent electrode patterns, and the conductive element different from the first and second transparent electrode patterns were formed.

<<First Curable Transparent Resin Layer and Second Curable Transparent Resin Layer>>

In the same manner as in Examples 1 to 11 and Comparative examples 1 to 15, a first curable transparent resin layer and a second curable transparent resin layer were formed on the front panel in which the mask layer, the transparent film, the first transparent electrode patterns, the pattern of the insulating layer, the second transparent electrode patterns, and the conductive element different from the first and second transparent electrode patterns had been formed. In this way, capacitive input devices (front panels) of Examples 101 to 113 and Comparative examples 101 and 102 were obtained in which the mask layer, the transparent film, the first transparent electrode patterns, the pattern of the insulating layer, the second transparent electrode patterns, the conductive element different from the first and second transparent electrode patterns, the second curable transparent resin layer, and the first curable transparent resin layer had been laminated in this order on the transparent substrate made of glass.

<<Preparation of Image Display Device (Touch Panel)>>

Each of the front panels of Examples 101 to 113 and Comparative examples 101 and 102 produced as above was stuck on a liquid crystal display element produced by the method described in JP2009-47936A. Thereafter, by a known method, image display devices of Examples 101 to 113 and Comparative examples 101 and 102 including the capacitive input device as a constituent were prepared.

<<Evaluation of Front Panel and Image Display Device>>

The capacitive input devices and the image display devices of Examples 101 to 113 had no problem in that the transparent electrode patterns were visually recognized.

In each of the aforementioned steps, the front panel 1, in which the mask layer, the transparent film, the first transparent electrode patterns, the pattern of the insulating layer, the second transparent electrode patterns, the conductive element different from the first and second transparent electrode patterns, the second curable transparent resin layer, and the first curable transparent resin layer were formed, did not experience the contamination of the opening portion and the back surface (non-contact surface) thereof and was easily washed. Furthermore, the front panel 1 did not have a problem of contamination of other members.

Moreover, there was no pin hole in the mask layer, and light-shielding properties thereof were excellent.

In addition, each of the first transparent electrode patterns, the second transparent electrode patterns, and the conductive element different from these patterns had no problem with conductivity. In contrast, the first transparent electrode patterns were insulated from the second transparent electrode patterns.

Furthermore, the first curable transparent resin layer did not have a defect such as air bubbles, and an image display device having excellent display characteristics was obtained.

What is claimed is:

1. A transfer film comprising:
a temporary support;
a first curable transparent resin layer;
a second curable transparent resin layer disposed adjacent to the first curable transparent resin layer; and
a peelable protective film in this order,
wherein the thickness of the first curable transparent resin layer is equal to or greater than 1 μm, and
wherein the refractive index of the second curable transparent resin layer is greater than the refractive index of the first curable transparent resin layer and equal to or greater than 1.6.

2. The transfer film according to claim 1,
wherein the refractive index of the first curable transparent resin layer is 1.5 to 1.53.

3. The transfer film according to claim 1,
wherein the refractive index of the second curable transparent resin layer is equal to or greater than 1.65.

4. The transfer film according to claim 1,
wherein the thickness of the second curable transparent resin layer is equal to or less than 500 nm.

5. The transfer film according to claim 1,
wherein the first curable transparent resin layer contains a polymerizable compound and a photopolymerization initiator.

6. The transfer film according to claim 1,
wherein the second curable transparent resin layer contains particles having a refractive index of equal to or greater than 1.55.

7. The transfer film according to claim 1,
wherein the second curable transparent resin layer contains a polymerizable compound.

8. The transfer film according to claim 1,
wherein both the first curable transparent resin layer and the second curable transparent resin layer are thermosetting resin layers.

9. The transfer film according to claim 1, further comprising a thermoplastic resin layer between the temporary support and the first curable transparent resin layer.

10. The transfer film according to claim 1,
wherein the refractive index of the first curable transparent resin layer is 1.51 to 1.52.

11. The transfer film according to claim 1,
wherein the first curable transparent resin layer includes an acrylic resin having a carboxyl group.

12. The transfer film according to claim 1,
wherein the protective film is in direct contact with the second curable transparent resin layer.

* * * * *